(12) United States Patent
Hassan et al.

(10) Patent No.: US 12,003,476 B2
(45) Date of Patent: Jun. 4, 2024

(54) COMMAND BASED COMMUNICATION

(71) Applicant: Microsoft Technology Licensing, LLC, Redmond, WA (US)

(72) Inventors: Amer Aref Hassan, Kirkland, WA (US); Eric Edmond Thomasian, Los Angeles, CA (US); Zhen Zhu, Coquitlam (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/842,336

(22) Filed: Jun. 16, 2022

(65) Prior Publication Data

US 2023/0412554 A1 Dec. 21, 2023

(51) Int. Cl.
| | | |
|---|---|---|
| *H04L 51/48* | (2022.01) | |
| *G06F 3/04842* | (2022.01) | |
| *H04L 51/18* | (2022.01) | |
| *H04L 51/42* | (2022.01) | |
| *H04L 65/403* | (2022.01) | |

(52) U.S. Cl.
CPC .......... *H04L 51/48* (2022.05); *G06F 3/04842* (2013.01); *H04L 51/18* (2013.01); *H04L 51/42* (2022.05); *H04L 65/403* (2013.01)

(58) Field of Classification Search
CPC ......... H04L 51/48; H04L 51/18; H04L 51/42; H04L 65/403; G06F 3/04842
See application file for complete search history.

(56) References Cited

U.S. PATENT DOCUMENTS

| | | | |
|---|---|---|---|
| 10,708,216 B1 | 7/2020 | Rao | |
| 2007/0288560 A1 | 12/2007 | Bou-ghannam et al. | |
| 2008/0071868 A1 | 3/2008 | Arenburg et al. | |
| 2012/0304079 A1* | 11/2012 | Rideout | H04L 12/1818 715/758 |
| 2014/0298210 A1* | 10/2014 | Park | G06F 3/0487 715/758 |
| 2016/0283069 A1* | 9/2016 | Gupta | G06Q 10/10 |

(Continued)

FOREIGN PATENT DOCUMENTS

| | | |
|---|---|---|
| CN | 110493018 A | 11/2019 |
| CN | 112910756 A | 6/2021 |

OTHER PUBLICATIONS

"GoToMeeting", Retrieved from: https://www.cu.edu/sites/default/files/GoToMeeting_User_Guide.pdf, Sep. 12, 2021, 237 Pages.

(Continued)

*Primary Examiner* — Jennifer N Welch
*Assistant Examiner* — Parmanand D Patel
(74) *Attorney, Agent, or Firm* — Schwegman Lundberg & Woessner, P.A.

(57) ABSTRACT

A method and system for providing a command-based communication are disclosed, comprising identifying a target user from a user database based on parsed entries subsequent to an action command in a compose field of a group thread, receiving a user selection of one of two operation modes in which the system operates, including a fork mode and a notification mode, and responsive to the user selection selecting the fork mode, creating and transmitting a fork communication thread between the user and a second user, the fork communication thread diverging from the group thread.

19 Claims, 18 Drawing Sheets

(56) References Cited

U.S. PATENT DOCUMENTS

| | | | |
|---|---|---|---|
| 2018/0198887 A1* | 7/2018 | Nishimura | H04L 67/306 |
| 2018/0270181 A1* | 9/2018 | Shan | H04L 65/611 |
| 2018/0302357 A1 | 10/2018 | Cohen | |
| 2018/0329592 A1 | 11/2018 | Ramarao et al. | |
| 2022/0030042 A1* | 1/2022 | Roedel | H04L 65/4015 |

OTHER PUBLICATIONS

"Radio Buttons Control (Deprecated)", Retrieved from: https://www.ibm.com/docs/en/bpmoc?topic=SS964W/com.ibm.wbpm.ref.doc/topics/rstockcontrols_radiobuttons.html, Mar. 4, 2021, pp. 1-4.

"Using Collaboration Cloud Service", Retrieved from: https://docs.oracle.com/en/cloud/saas/field-service/19b/fascl/manage-chats-and-conferences.html, Retrieved Date: Mar. 30, 2022, pp. 1-4.

Nesteby, et al., "Designing a collaboration application for Sense Intellifield/Technology with use of Contextual Design", In Masters Thesis of Agder University College, May 2004, 61 Pages.

"A Guide To Microsoft Teams For Beginners: 101", Retrieved From: https://web.archive.org/web/20210328034436if_/ https://www.officesolutionsit.com.au/hubfs/Content/Microsoft%20Teams/Office%20Solutions%20IT%20-%20Microsoft%20Teams%20101%20guide.pdf, Mar. 28, 2021, 22 Pages.

"International Search Report and Written Opinion Issued in PCT Application No. PCT/US23/019547", dated Sep. 22, 2023, 13 Pages.

\* cited by examiner

COMMAND BASED COMMUNICATION

TECHNICAL FIELD

The present disclosure generally refers to methods and systems for command-based communication in accordance with some embodiments.

BACKGROUND

The use of software and hardware technologies have become a commonplace method of communication between people. Text communication, in particular, such as through instant messaging, text messaging, chat applications, email communications, etc., has become a primary way of communication. In particular, text communication has developed as a supplement to other forms of communication, such unified communication, or communication supporting multiple modalities, including audio, video, messaging, as well as screen, document, or application sharing. As the prevalence of text communication grows, so do the variety and use of features supported by communication services. Each additional feature introduces unique risks to data privacy, security, and access.

SUMMARY

Embodiments of the present disclosure include a method and system for providing a command-based communication. A target user can be identified from a user database based on parsed entries subsequent to an action command in a compose field. A user selection of one of two operation modes in which the system operates, including a fork mode and a notification mode, can be received. Responsive to the user selecting the fork mode, a fork communication thread diverging from the group thread can be created and transmitted to the second user.

In an example, a target user and a control element can be displayed, the control element corresponding to the target user and indicating a desire to transition an operation mode of the system from a notification mode associated with the action command to a fork mode diverging from a group thread. Responsive to a first user selecting the fork mode, such as through the control element, a fork communication thread diverging from a group thread of the group communication stream can be created and transmitted to a second user. In certain examples, the fork communication thread can include extracted contents of the group thread packaged with a received message from the compose field.

Additional embodiments include a method and system for providing a common group suggestion as a recipient of a message in a communication service. A communication platform, or a communication service connected to the communication platform, can identify one or more common groups of a communication service based on received first and second recipients of a message and display the one or more common groups to a first user as a suggested recipient. One or more of the identified common groups can be and selected, and the message can be transmitted to the selected common group.

The claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media (i.e., not storage media) may additionally include communication media such as transmission media for wireless signals, etc.

This Summary is provided to introduce a selection of concepts that are further described below in the Detailed Description. It is not intended to identify key features or essential features of the claimed subject matter, nor is it intended to be used to limit the scope of the claimed subject matter.

BRIEF DESCRIPTION OF THE SEVERAL VIEWS OF THE DRAWINGS

The disclosed aspects will hereinafter be described in connection with the appended drawings that are provided to illustrate and not to limit the disclosed aspects.

DETAILED DESCRIPTION

Figure 1:
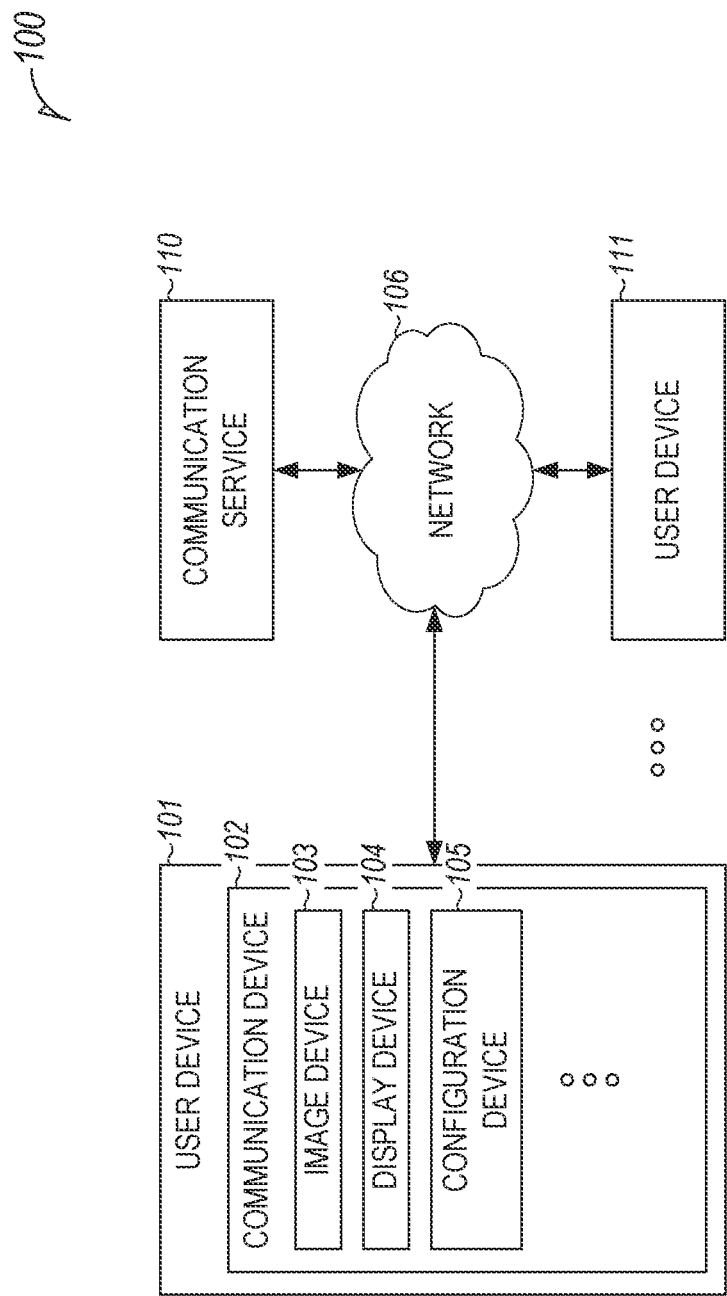
FIG. 1 illustrates an example computer system.

Unified communication systems provide a variety of meeting services to bring together and share information between various combinations of in-room, remote, or virtual participants in different ways. As sharing becomes easier and more prevalent, the need to control permissions, security, and access to sensitive information increases, as well as the need to reduce inadvertent disclosure of sensitive information.

For example, organizations manage people in different ways. The information and communication that occur with respect to recurring meetings, such as associated with groups of people in an organization, students in a class, etc., have become a particular challenge. There is a need to have access to previous information, frequently invite new users, while maintaining data security and privacy of otherwise changing groups of people. A text thread associated with a recurring meeting of a first set of users may not be appropriate to share with a different set of individuals invited to the next occurrence of the recurring meeting. Attendees of a unified communication session are often alerted to new or external attendees, such as outside attendees to an internal recurring meeting, etc., however, such new or external attendees often have access to previous information, chat messages, documents, etc. that originated before such users were invited, or are provided after such users leave, but still have access. Even invited users that do not attend, such as users who attempt to join after the meeting ends, etc., may sometimes have access to communications from previous meetings or may retain access for future communications. Many situations can be managed by permissions or different access levels (e.g., guest access, etc.), or by attendees themselves in different ways, such as by having separate message threads open, but human error (e.g., not appreciating the audience, typing in the wrong window, etc.) remains a prevalent source of inadvertent disclosure of sensitive information.

In additional, navigation of communication platforms and associated options, features, and services has become increasingly burdensome. Managing, navigating to, and selecting specific options or features has become increasingly difficult and time consuming, particularly for users of small devices with limited screen space, often requiring users to divert focus away from a compose field of a communication platform to navigate predetermined, selectable, or searchable menus of options or features, selectable through additional selection, tap, mouse click, or other manual input from outside of the compose field. For example, during online meetings having video, navigation to additional message threads separate from that associated with the online meeting will divert focus of a user away from the online meeting, and in certain examples requiring a majority of available screen space, or navigation of additional windows.

The present inventors have recognized, among other things, systems and methods to provide command-based communication from a group communication stream to, among other things, improve navigation between different messaging modalities and increase data security and efficiency of message-based communication. In an example, the transition between different messaging modalities can include transitioning between operation modes, such as from a default notification mode in a group setting to a fork mode outside of the group setting providing a separate message thread between first and second users separate from the any unselected members of the group setting.

In certain examples, a command-based communication can be initiated from a compose field of a group thread of the group communication stream, in certain examples, without navigating away from the group thread. For example, a user, while participating in an online meeting, can use a compose field of a group thread of the online meeting to create a fork communication thread diverging from the group thread with one or more users separate from the group thread. Diverging from the group thread can include creating a new thread, separate from the group thread, the new thread between the user and a selected recipient, or adding a new message to an existing thread between the user and the selected recipient. The fork communication thread is not viewable to members of the group thread that are not specifically added to the fork communication thread by the user or the selected recipient.

Communication streams, such as the group communication stream, can include text streams (e.g., text messaging, email communication, etc.), video streams (e.g., video calls, etc.), or one or more communication threads between two or more users, such as of a conversation group in a communication service or platform. Communication streams can include multiple communication threads. For example, a conversation group of a communication can have one or more separate group threads. In certain examples, contents from the group communication stream (where the fork communication thread originated), such as one or more previous messages, attachments, etc., can be packaged and included with the fork communication thread to the second user, such as for reference, etc.

A technical solution contemplated herein provides an automated, rule-based system for providing command-based communication from a group communication stream, in certain examples, without the first user navigating or moving away from traditional character entry in a compose field of a communication platform, to address the technical problems of data security, inadvertent disclosure of sensitive information, and to improve navigation of an increasing number of options and features associated with unified communication.

An additional problem exists with selection of multiple message recipients. As individuals associated with particular groups change, such as an organization bringing on new employees, classrooms bringing in new students, etc., it can be difficult for users to know who to include in particular communications. Addressing communication to the appropriate parties can be difficult. Additionally, users with similar usernames are often mistaken for other users and inadvertently addressed or included. Groups of users are often arranged in common groups for a particular communication service (e.g., in distribution lists, directory databases, etc.). For example, specific teams (e.g., accounting, engineering, etc.) in an organization often have common groups with relevant members assigned by the organization itself, or determined and established by common communication that occurs across the communication service, such as through machine learning, etc. However, established common groups are often not known by individual users of the communication service, such as new hires, or sometimes even members of the common groups themselves. The communication service often has access to users of common group membership, but navigation to such is often burdensome. Further, ensuring that the proper recipient receives a message at first attempt reduces network traffic, reduces time and resources associated with under-delivered messages, etc.

The present inventors have further recognized systems and methods to automatically identify and suggest one or more common groups of a communication service to a user for inclusion as recipients to a message, without the user having to separately search for common group memberships, navigate away from the message, or otherwise divert focus from the message and intended recipients, improving the accuracy of intended recipient, making appropriate suggestions not otherwise known to the user, reducing otherwise back-and-forth in trying to find a proper home for receipt of the message, increasing the richness of conversation and diversity of participation with the message.

A technical solution contemplated herein provides automated suggestions of one or more common groups of a communication service based on information about one or more recipients in certain examples, without the first user navigating away from the message or knowing the name of the common group, or even that a common group exists, to address the technical problems of inadvertent disclosure of sensitive information, misaddressed or under-addressed messages (messages not having all relevant members), and to improve navigation of an increasing number of options and features associated with unified communication.

FIG. 1 illustrates an example computer system 100 for providing a communication stream between users, such as users of first and second user devices 101, 111 communicating directly or indirectly through a communication service 110 coupled to a network 106.

The communication service 110 can include one or more devices, such as one or more processors, a transceiver, memory, storage, database, server, etc. configured to manage communication streams, including emails, documents, chats, comments, texts, images, animations, hyperlinks, or voice or video communication for a group of users, such as of one or more communication platforms, through connected devices, such as the first and second user devices 101, 111 or any number of additional authorized devices and users. Groups of users can include organized groups, subgroups, or channels of employees within an organization stored in a user database, or other self-organized groups of users inside or outside of an organization or between multiple organizations. In an example, the communication device 102 can include one or more communication platforms (e.g., Microsoft Teams, Skype, etc.) installed on or accessible to a respective user device, or the communication device 102 can include hardware and software configured to enable the one or more communication platforms to communicate to or from the respective user device.

The first user device 101 is exemplary, and can include a communication device 102 configured to communicate with one or more additional devices, such as the second user device 111, either directly or through the communication service 110. The communication device 102 can be configured to send or receive information to or from the communication service 110. The communication device 102 can include an image device 103, a display device 104, a configuration device 105, or one or more other devices or modules.

The image device 103 can be configured to send, receive, or store images associated with the communication service 110. In certain examples, the images can include icons, such as emojis, representations of emotions (e.g., emoticons), pictures, drawings, avatars, profile pictures, representations of one or more users, etc. In certain examples, the image device 103 can include a repository of images of the first user device 101 or otherwise associated with the first user 106 (e.g., cloud-based storage, online profiles, etc.). The display device 104 can be configured to display messages and other visual content associated with the communication device 102, such as using a display or portion of a display of the first user device 101. The configuration device 105 can be configured to receive, store, and maintain one or more of device or user profiles, including selected user settings or preferences, previous user selections, or one or more other settings or preferences of the first user 106 or one or more other users, such as associated with a communication stream of the communication service 110, etc. In other examples, the one or more device or user profiles can be stored or maintained in a data structure or database of or accessible by the communication service 110.

A shortcode is specific instruction to perform an action in a communication platform or other application. Shortcodes are generally triggered by action commands. An action command is a character, a symbol, or a specific combination of characters or symbols indicating a desired action, or one of a set of desired actions, such as of a first user.

One example shortcode is the "@mention" response triggered by input of the "@" symbol as an action command and one or more characters of a username or other identifying characteristic (e.g., last name, first name, email address, etc.) of a target user. Characters generally include letters, numbers, or symbols, such as selectable by a first user using a keyboard. In response to receiving the action command and the one or more characters, one or more target users starting with (or including) the received one or more characters can be identified, such as from a user database, existing users in the communication stream, or one or more users having previous communication with or otherwise available to the first user, etc. The one or more target users can be displayed to the first user for selection and insertion into the communication stream. Selected users added to a message can be notified and, in certain examples, added to the communication stream if not already member. The generated list of users can be further narrowed and sorted, for example, in a user selection mode, according to a set of rules (e.g., alphabetically, according to prior activity, inclusion in the communication stream, history with the user, etc.), and additionally with each additionally received character following the "@" symbol until the first user makes a selection, exhausts the list of users, enters the complete username, or exits the function of the conventional "@mention" response, such as by entering backspace, left arrow, delete, or escape symbols, selecting away from the generated list, etc. Traditional autocomplete suggestions can be made to complete the username according to one or more rules, such as giving priority to users already members or participants in the communication stream, or scoring by one or more other factors, such as a history of the first user, an amount of participation in the communication stream, etc.

Figure 2A:
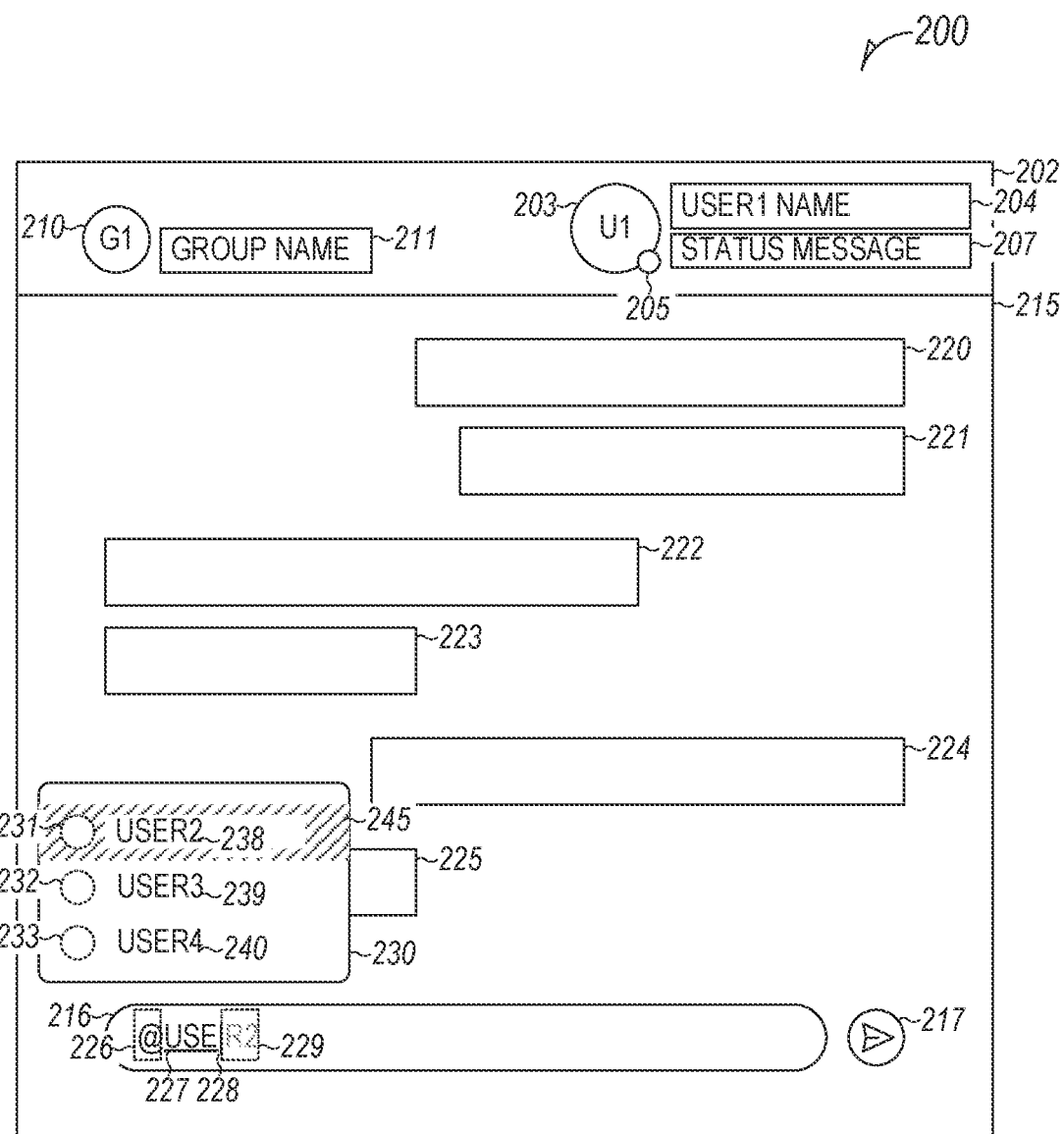
FIGS. 2A-2C illustrate an example notification feature in a group communication stream.
Figure 2B:
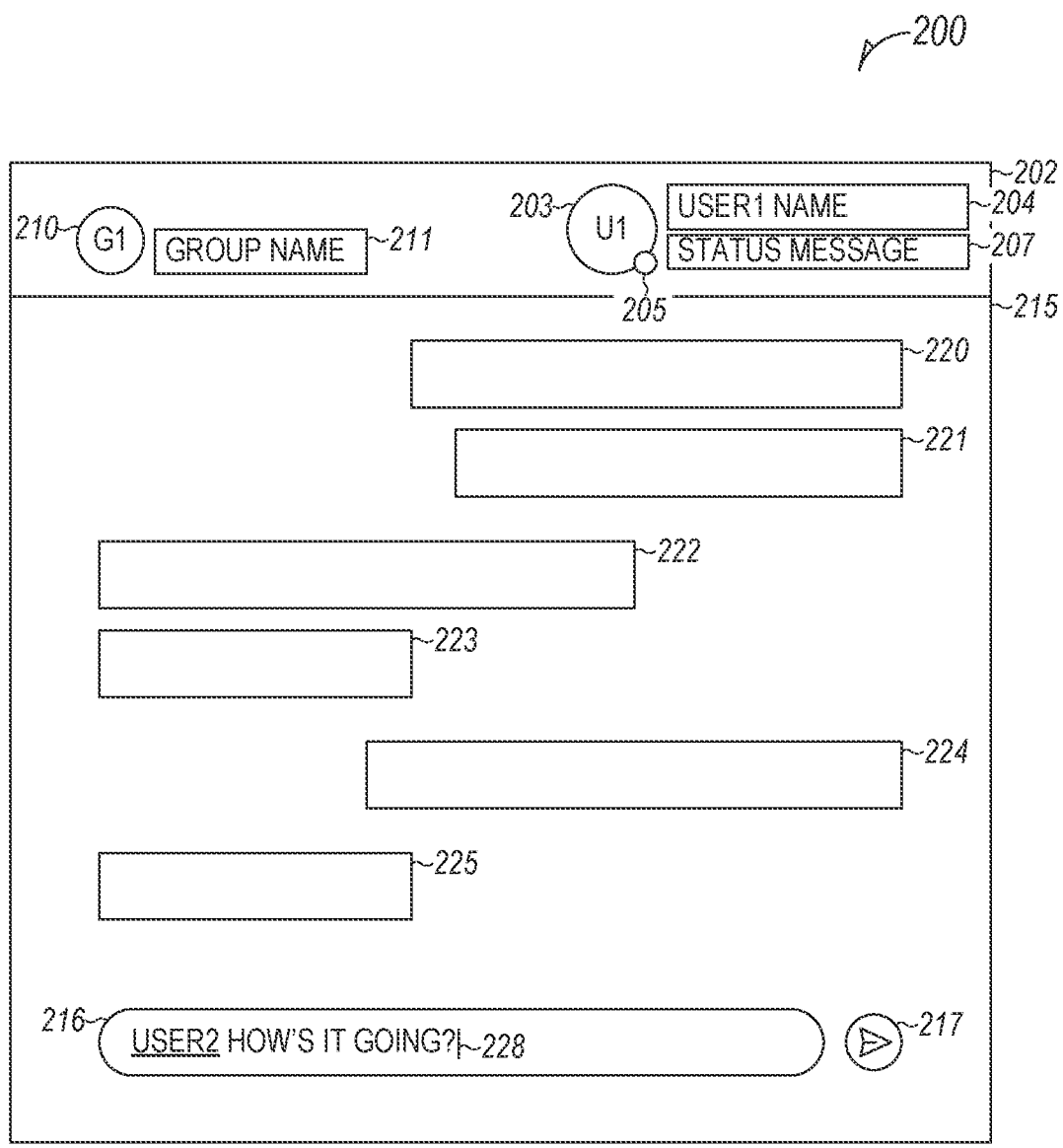
Figure 2C:
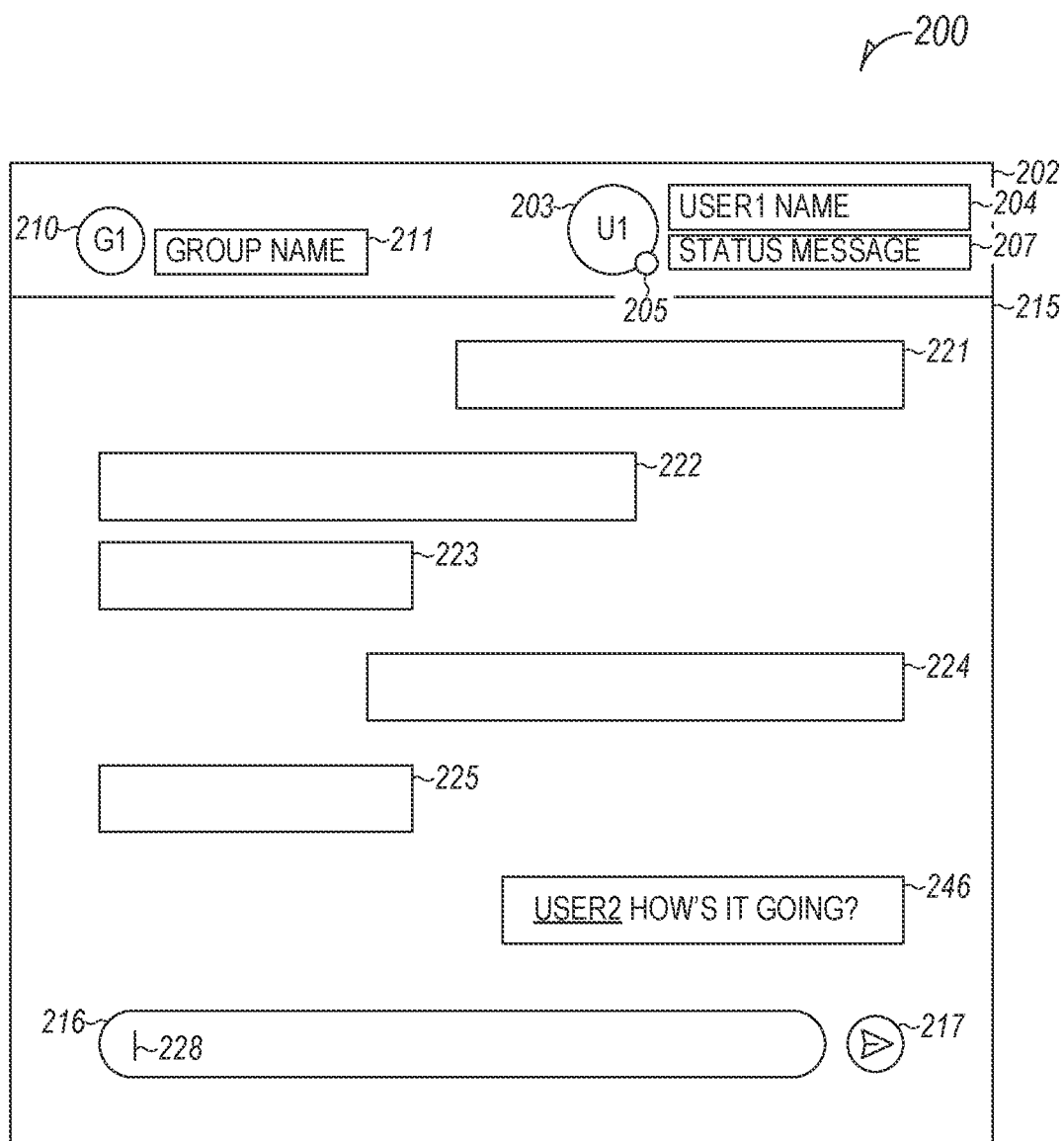

FIGS. 2A-2C illustrate an example user interface 200 of a communication platform of a first user including interactions with an "@mention" menu 230 triggered by entry of an "@mention" shortcode including an action command, the "@" symbol 226, followed by one or more characters 227 of a username or other identifying characteristic.

The user interface 200 includes a header portion 202 and a body portion 215. The header portion 202 can include a number of configurable fields, such as an avatar 203 of the first user, a username 204 of the first user, a status badge 205, a status message 207 of the first user, a group avatar 210 for a group associated with the communication thread, a group name 211 of the group, etc. The body portion 215 includes right- and left-justified messages of a communication thread, the compose field 216, and a send button 217. The compose field 216 can include a field in which the first user enters a message or other commands or shortcodes for interaction with one or more other users or communication streams. The right-justified messages (e.g., messages 220, 221, and 224) include messages of the first user, for example, entered in the compose field 216 and sent upon selection of the send button 217 or other send action or character. The left-justified messages (e.g., messages 222, 223, and 225) include messages of one or more users separate from the first user.

The communication thread illustrated in the body portion 215 of the user interface 200 of the communication platform can be one thread of a communication stream of a group of users comprising the first user (e.g., an organization or larger group of users, etc.). The communication stream can include data from the communication thread or a number of communication threads, in certain examples, including communication threads from a number of different communication platforms, from the group of users. For example, a communication thread can include a conversation between a first user of an organization and a second user, whereas a communication stream can include all communication of the first user or the organization on this communication platform or a number of communication platforms.

The "@mention" menu 230 includes a set of one or more users, illustrated in FIG. 2A as avatars 231-233 and respective usernames ("USER2"-"USER4") 238-240, for example, in a user selection mode. The set of one or more users can be selected from a plurality of users available to (but different from) the first user according to, among other things, the usernames matching one or more characters 227 from the compose field 216 following the "@" symbol 226, such as between the "@" symbol 226 and a cursor 228. The avatars 231-233 can include selected avatars or profile pictures representative of or associated with the respective one or more users. The plurality of users available to the first user can include one or more users of or associated with the group or otherwise available to the first user in the communication stream, such as in a user database of the user, of a communication service, etc. For example, if the one or more characters 227 from the compose field 216 between the "@" symbol 226 and the cursor 228 include the text character "S", the set of one or more users can include users available to the first user having respective usernames starting with the text character "S" at some major portion, such as a first letter of a first name or a last name associated with the username, a first character of the username, a first character of an email address associated with the username, etc.

The "@mention" menu 230 can include a highlighted selection 245, initially (without additional user input) a default selection, a highest rated selection, a most-recent selection, or a closest match to the one or more characters 227 from the compose field 216 following (or directly succeeding) the "@" symbol 226. The highlighted selection 245 can change upon input by the first user, such as by a filter or sort associated with additionally received one or more characters in the compose field 216, selection characters (e.g., an up arrow, a down arrow, etc.), or selection of a username or movement of a user input over the "@mention" menu 230.

The compose field 216 can include autocomplete characters 229 of the highlighted selection 245 after the cursor 228, in certain examples having a different font than the one or more characters 227 entered by the first user in the compose field 216 until the autocomplete characters 229 are optionally accepted by the first user, such as by a selection character (e.g., a right arrow, a tab character, etc.). Selecting a user from the "@mention" menu 230, entering all characters of a username of the "@mention" menu 230 in the compose field 216 following "@" symbol 226, or entering a selection character to select the highlighted selection 245 or autocomplete characters 229 (e.g., a right arrow selection character, a tab character, etc.) can automatically fill the compose field 216 with the username of the selected user or a representation of the selected user to be displayed in the communication stream upon selection of a send button 217 or other send action or character (e.g., an enter or return character from an active cursor in the compose field 216, etc.). In addition to displaying the username of the selected user in the communication stream, separate notification of the "@mention" in the communication stream can be provided to the selected user, separate from the communication thread.

After selecting a user, an additional character message can optionally be input in the compose field 216. For example, in FIG. 2B, the second user ("USER2") 238 has been selected and an additional character message "HOW'S IT GOING?" has been entered in the compose field 216. FIG. 2C illustrates an additional right-justified message 246 including the displayed username of the selected user and the additional character message.

In an example, the communication thread illustrated in FIG. 2B can include a chat interface of a communication platform between the first and second users. In an example, the separate notification of the "@mention" in the communication stream can include a notification to one or more different devices of the second user, such as a desktop notification separate from the or in addition to the communication thread, a notification on the communication platform, a mobile notification, or an email communication to the second user separate from the chat interface illustrated in FIG. 2B.

Although illustrated herein as an "@" symbol 226, other example action commands can include an open parentheses "(" character, a colon (":"), double-colon ("::"), open bracket ("["), etc.

FIGS. 3A-3D illustrate an example user interface 300 of a communication platform of a first user including interaction with a user selection menu including a combination of a traditional "@mention" menu 230, such as described above with respect to FIGS. 2A-2C, and a fork mode menu 355 as a supplement to launch, create, or provide a fork communication thread, in certain examples, a new thread, from the existing communication thread. The user interface 300 includes a header portion 202 having a number of configurable fields. The body portion 215 includes messages of a communication thread, the compose field 216, and a send button 217.

Figure 3A:
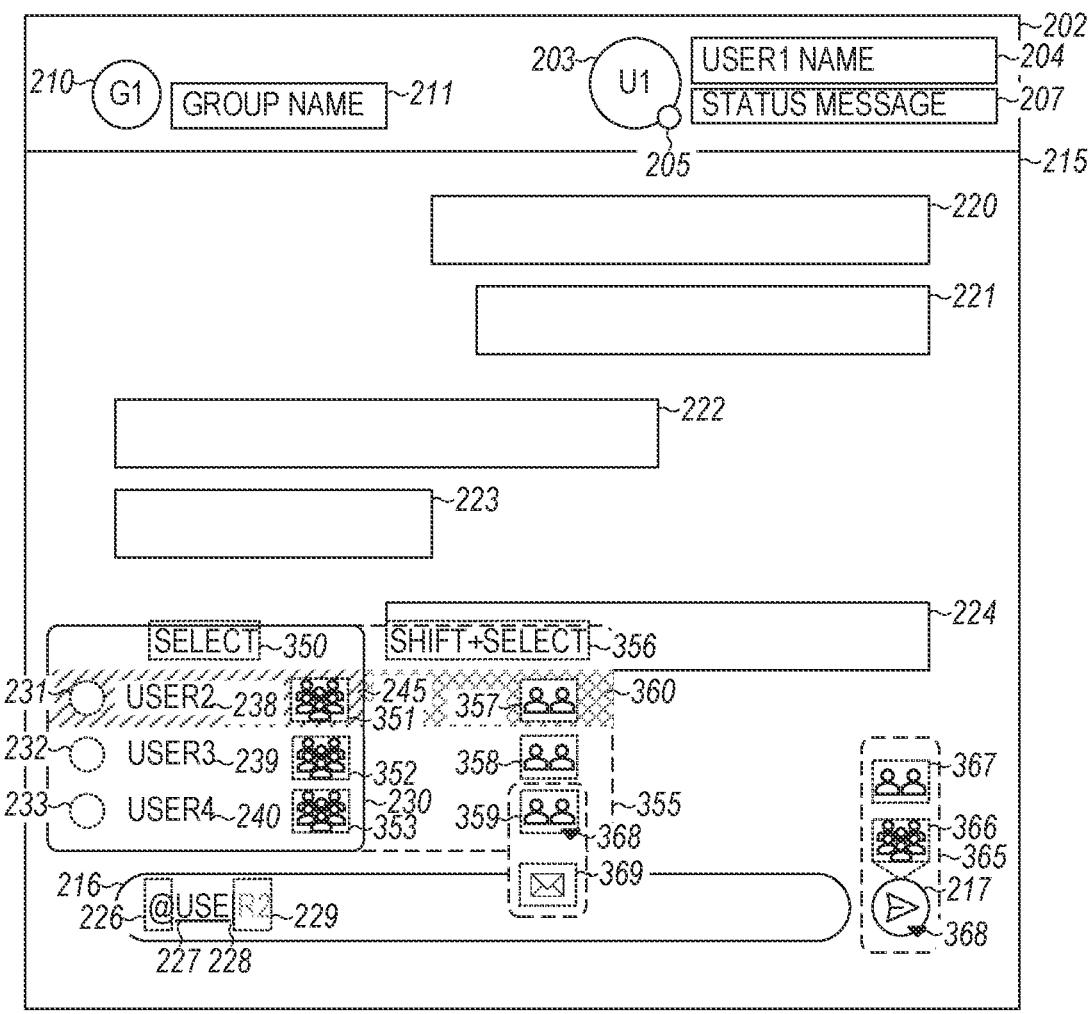
FIGS. 3A-3D and 4A-4B illustrate an example fork message feature in a group communication stream.

The "@mention" menu 230 in FIG. 3A is similar to that described above with respect to FIGS. 2A-2C (as are other similarly labeled elements), but additionally includes optional selectable group communication stream icons 351, 352, 353 to further distinguish the traditional "@mention" response from the corresponding fork mode menu 355, which includes a contrasting, selectable, private, fork icons 357, 358, 359, illustrating a conversation between first and second users, and not the contrasting group of the group communication stream icons 351, 352, 353.

In certain examples, if the existing communication thread is not a group thread (e.g., a communication thread having more than two users, etc.), but a communication thread between two users, the selectable group communication stream icons 351, 352, 353 can be omitted, or can include icons of the respective number of users, such as two users instead of the group (e.g., 6 users) currently illustrated, etc., such as to clearly delineate to the first user the action that will occur once selected.

As above with respect to FIGS. 2A-2C, the highlighted selection 245 in the "@mention" menu 230 can change upon input by the first user, such as by a filter or sort associated with additionally received one or more characters in the compose field 216, selection characters (e.g., an up arrow, a down arrow, etc.), or selection of a username or movement of a user input over the "@mention" menu 230. However, in FIGS. 3A-3C, the fork mode menu 355 includes a second highlighted selection 360. The highlighted selection 245 of the "@mention" menu 230 additionally interacts with the highlighted selection 360 of the fork mode menu 355, such as by additional selection characters (e.g., a right arrow to move from the highlighted selection 245 in the "@mention" menu 230 to a corresponding selection in the fork mode menu 355, a left arrow to move back, etc.), or movement of a user input (e.g., selection, tap, mouse click, or other manual input from the user, etc.) over the fork mode menu 355.

Figure 3B:
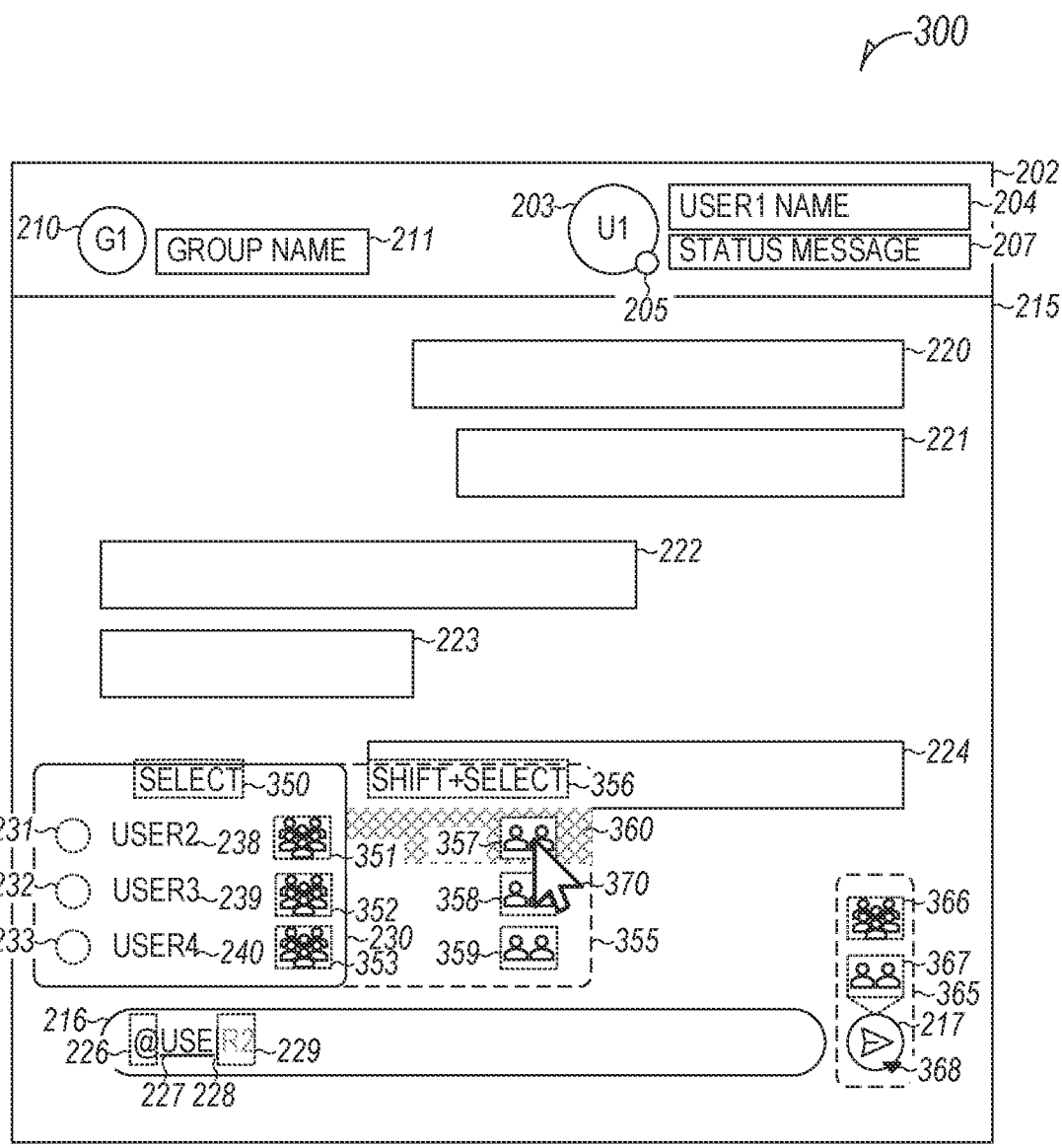
Figure 3C:
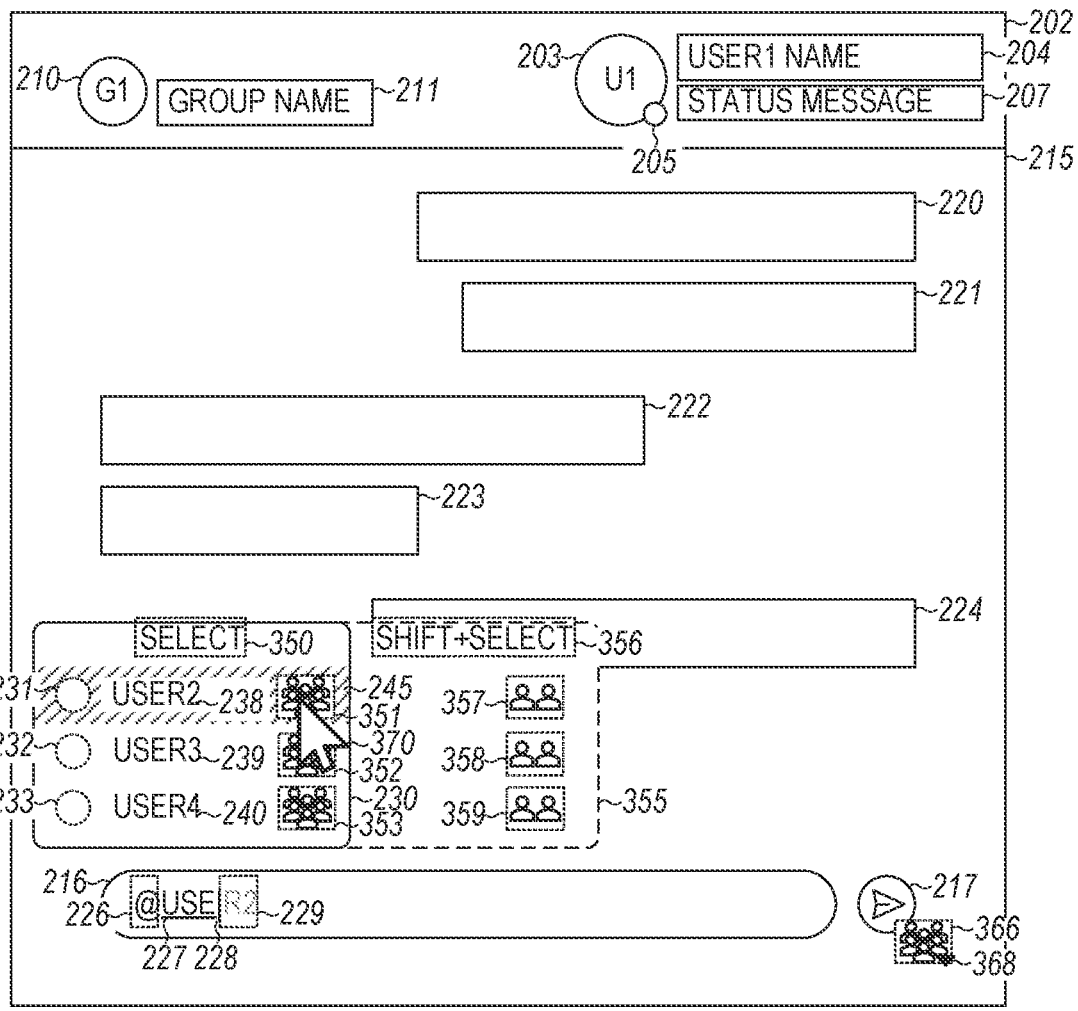

In certain examples, the highlighted selection 245 can be the default selection, and the second highlighted selection 360 can appear in response to a selection character (e.g., a right arrow) or movement of the user input. Although illustrated in FIG. 3A as having the highlighted selection 245 and the second highlighted selection 360, as illustrated in FIGS. 3B-3C, Similarly, the highlighted selection can toggle in response to selection characters or user input, such as a user input 370 (e.g., a mouse cursor, etc.).

In an example, the fork mode menu 355 can appear as a supplement to the "@mention" menu 230 when the first user is drafting a message or otherwise selecting a target user from a group communication stream. In certain examples, the fork mode menu 355 may not be displayed in an already-private communication between two users, or in a private or one-on-one communication thread with the target user. However, in other examples, the fork mode menu 355 can appear as a supplement to each "@mention" response, so long as one or more of the target users is not the only other user of the existing communication thread, such as to allow the first user the option to select a fork mode communication with the target or selected user, instead of adding the selected user to the existing communication thread, or adding the corresponding message to the existing communication thread, regardless of whether the selected user is already a participant of the existing communication thread.

Although discussed herein with respect to two users, a fork communication thread can include more than two users, added as described above with respect to "@mention" users. Further, in contrast to that described above with respect to FIGS. 2A-2C, the set of one or more users, or target users, can include the first user, such as to enable the first user to create a command-based fork from the communication stream (e.g., often a group communication stream) to a separate thread, including information (e.g., messages, attachments, etc.) from the existing communication thread and a message to provide a message. In certain examples, the "@mention" response can be used to create a command-based shortcode, separate from simple email forward, to create a fork response from a first communication stream (e.g., a group message thread, an email chain, etc.) to a second, often more private communication stream, such as to retain or discuss sensitive information in a controlled environment more securely. In certain examples, the fork communication thread can include a link back to the original communication thread. Additionally, if the target user is the first user, the respective fork icon, in the fork mode menu 355 or elsewhere, can include an icon of a single user, an icon or avatar of the first user, etc.

In an example, the "@mention" menu 230 can optionally include, separate from or in addition to the fork mode menu 355, one or more control elements. In an example, the control element can include a description of a selection action to control selection of the operation mode (e.g., such as to select between an "@mention" response versus a fork mode response, etc.). For example, a first selection action ("SELECT") 350 can be displayed in the "@mention" menu 230 including a text description to invoke an action in such menu. The first user can select the highlighted selection 245 of the "@mention" menu 230 by traditional selection (e.g., a selection character, such as an enter or return character, a tab character, etc., or a user input selection, such as a mouse click, a long tap, a double-tap, etc.). A second selection action ("SHIFT+SELECT") 356 can be displayed in the fork mode menu 355 including a description to invoke a corresponding action in such menu. The first user can select the second highlighted selection 360 of the fork mode menu 355 by a combination of the shift key and traditional selection.

Although illustrated herein as the instructions "SELECT" and "SHIFT+SELECT", other example text instructions can be used.

For example, if both of the highlighted selection 245 in the "@mention" menu 230 and the second highlighted selection 360 in the fork mode menu 355 are shown, entry of a return character can select the highlighted selection 245, whereas holding down the shift key and entering the return character can select the second highlighted selection 360, such that either can be selected by the first user without the first user having to move their hands away from the keyboard or even toggle between selections using right and left arrows, etc.

In other examples, the selection action can optionally include, separate from or in addition to that described above, an expandable send menu 365 associated with the send button 217, where the send button 217 itself can indicate the type of transmission that will be transmitted. In certain examples, selection of either the highlighted selection 245 or the second highlighted selection 360 can trigger display of one of a group communication stream icon 366 or a fork icon 367. In other examples, an additional toggle selection 368 on the send button 217 can be used to display the expandable send menu 365 or break out the group communication stream icon 366 or the fork icon 367 prior to selection.

In other examples, the fork mode menu 355 can trigger an email message to a selected target user, represented by an email icon 369, in certain examples, selectable as an additional toggle selection 368 on one or more of the selectable group communication stream icons 351-353 or fork icons 357-359. Although illustrated herein with respect to the fork icon 359, such toggle selection 368 to switch from messaging to email or vice versa are applicable to all icons or menus disclosed herein.

Figure 3D:
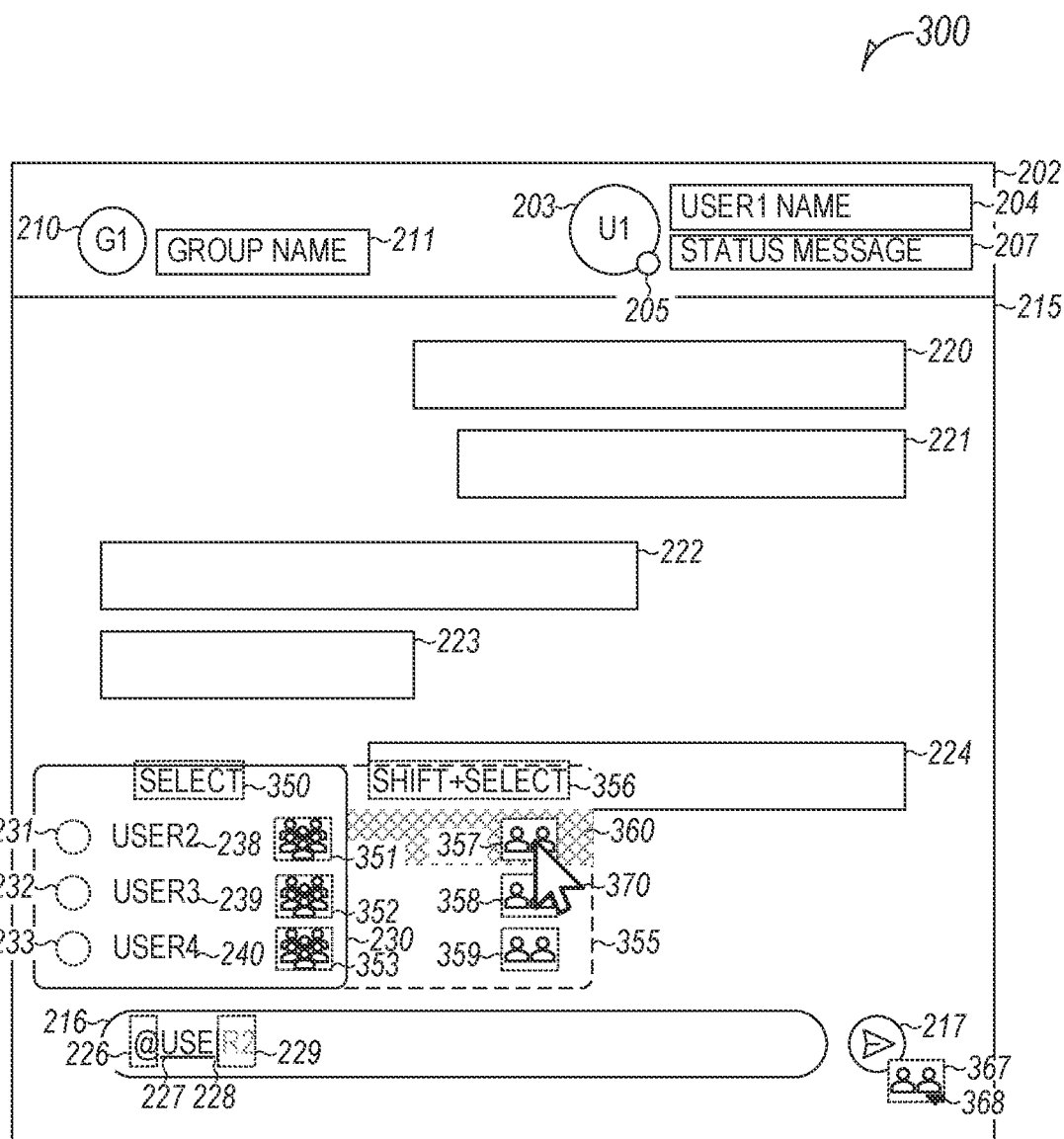

FIGS. 3B-3D illustrate additional toggling between the highlighted selection 245 and the second highlighted selection 360, such as by user input 370 over a respective menu or selectable element. Selection of the fork icon 357 of the second user ("USER2") 238, such as by a user input 370 (e.g., a mouse click, a long tap, a double-tap, etc.), can autofill the selection in the compose field 216 and, in certain examples, reposition the fork icon 367 proximate the send button 217 in the expandable send menu 365, such as illustrated in FIG. 3B. In contrast, selection of the group communication stream icon 351 of the user input 370 of the second user ("USER2") 238, such as by a user input 370 (e.g., a mouse click, a long tap, a double-tap, etc.), can autofill the selection in the compose field 216 and, in certain examples, reposition the group communication stream icon 366 proximate the send button 217 in the expandable send menu 365, similar to that illustrated in FIG. 3A.

In other examples, selection of the group communication stream icon 351 of the user input 370 of the second user ("USER2") 238, such as by a user input 370 (e.g., a mouse click, a long tap, a double-tap, etc.), can autofill the selection in the compose field 216 and supplement the send button 217 with the group communication stream icon 366 as illustrated in FIG. 3C. In certain examples, the group communication stream icon 366 itself can include a toggle selection 368, invocation of which can toggle the operation mode, such as after a user has been added in the compose field 216, etc.

In contrast, selection of the fork icon 357 of the second user ("USER2") 238, such as by a user input 370 (e.g., a mouse click, a long tap, a double-tap, etc.), can autofill the selection in the compose field 216 and supplement the send button 217 with the fork icon 367 as illustrated in FIG. 3D.

In certain examples, the fork icon 367 itself can include a toggle selection 368, invocation of which can toggle the operation mode, such as after a user has been added in the compose field 216, etc.

In other examples, instead of waiting for an action command, selection of a toggle selection 368, such as on the send button 217 or otherwise associated therewith, without a user in the compose field 216, can prompt entry of a target user by the first user. In an example, a separate menu of target users can be displayed to the user and selected, such as by radio button, for a fork communication thread, similar to that discussed herein.

Figure 4A:
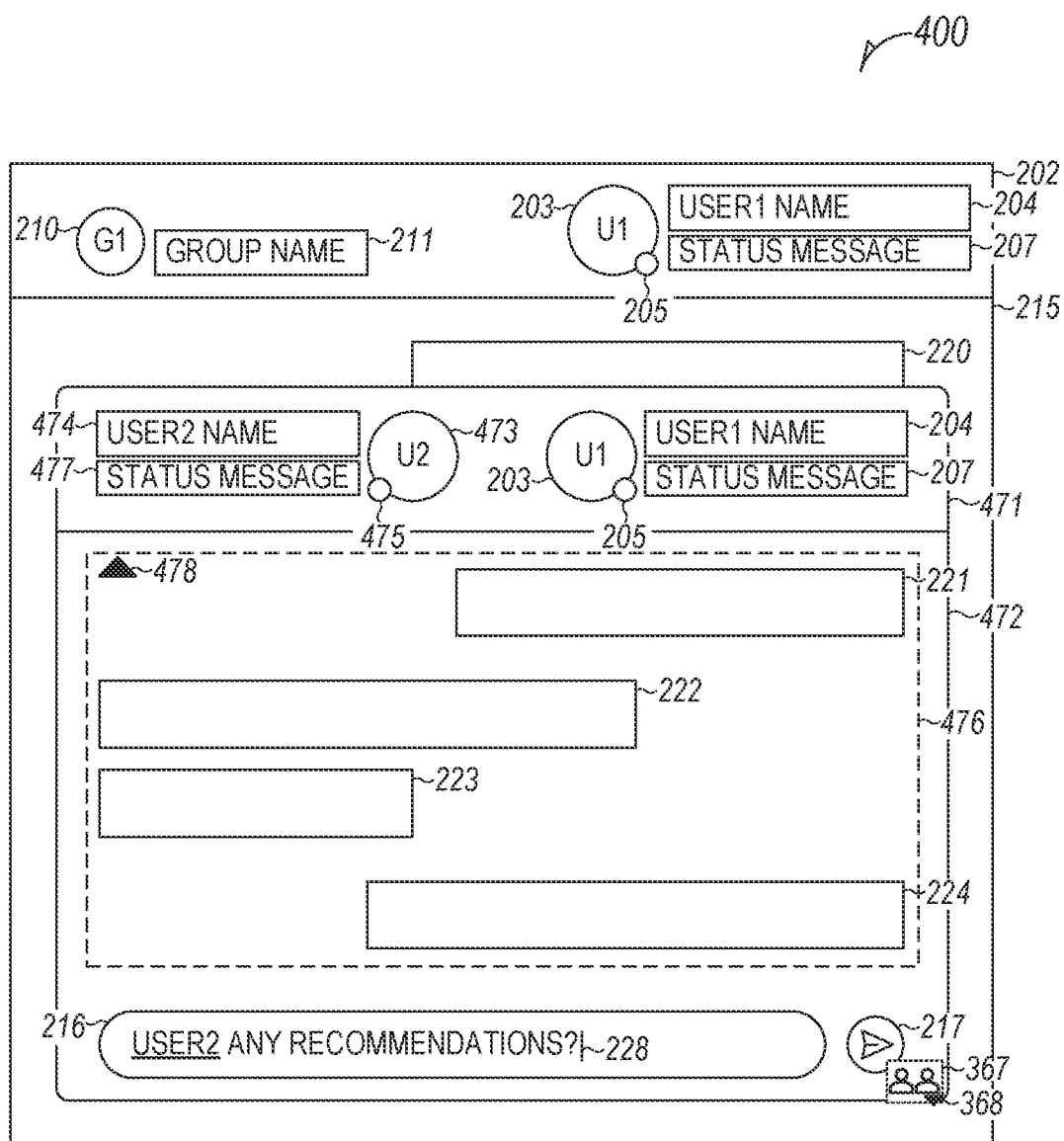
Figure 4B:
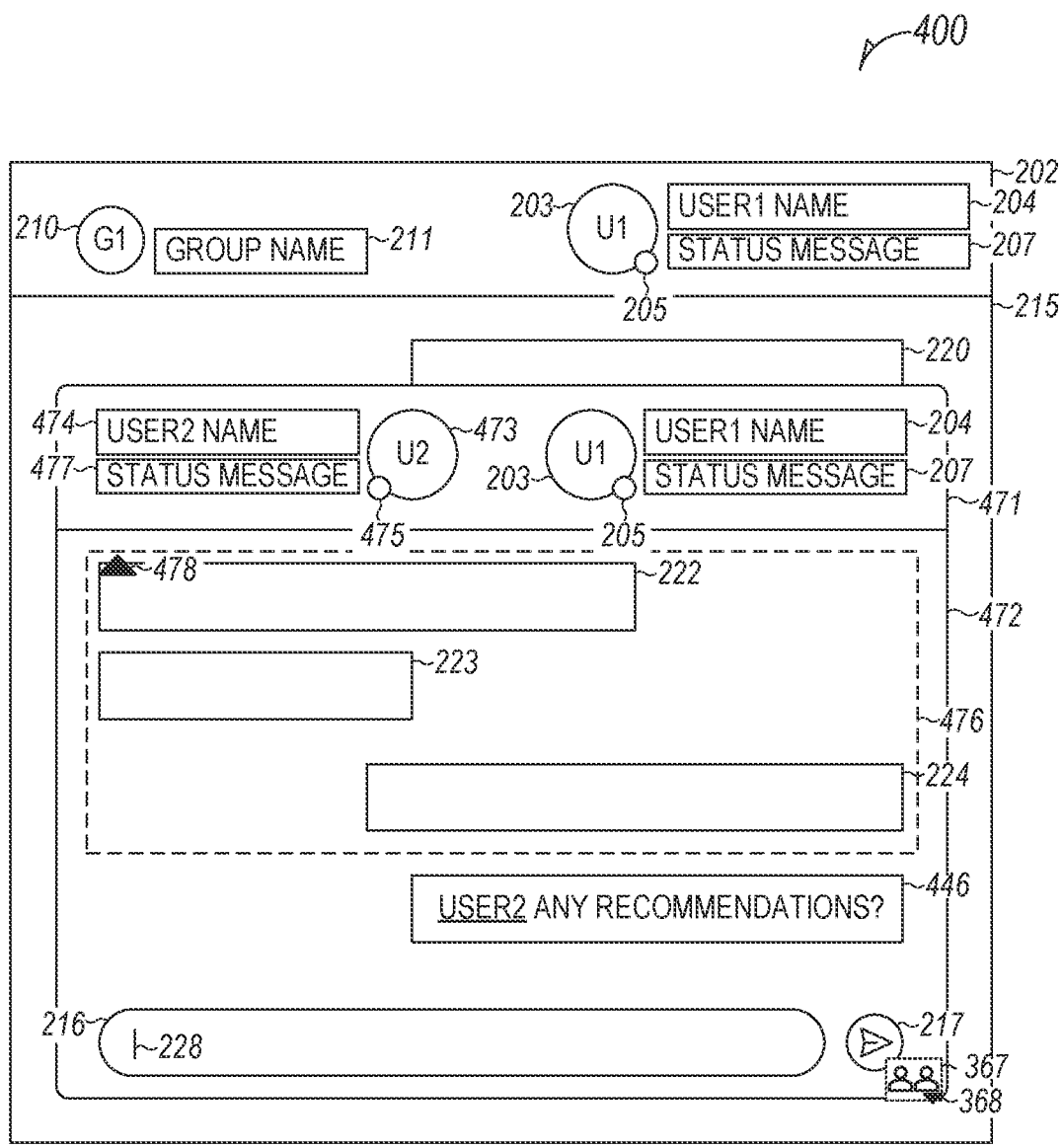

FIGS. 4A-4B illustrates an example user interface 400 including a pop-up window of a fork communication thread having a header portion 471 and a body portion 472 over a body portion 215 of a corresponding group thread, such as after invocation of a fork mode from the group thread by a first user. Although illustrated as a pop-up window over a group thread, in other examples, a separate user interface or window can be launched after invocation of the fork communication thread. However, the pop-up over the group thread, in certain examples, as part of the group thread, can reduce user error associated with typing in the wrong window. In certain examples, selecting screen area of the group thread can toggle the user interface back to the group thread and close or minimize the pop-up window or otherwise separate the fork communication thread from the group thread.

The header portion 471 of the fork communication thread can include a number of configurable fields, such as an avatar 203 of the first user, a username 204 of the first user, a status badge 205, a status message 207 of the first user, etc. Instead of a group name and icon associated with a group thread, the header portion 471 of the fork communication thread can include additional fields of a selected second user, such as an avatar 473 of the second user, a username 474 of the second user, a status badge 475 of the second user, a status message 477 of the second user, etc. If additional users are added to the fork communication thread, similar fields can be added or repositioned to reflect the additional users.

The body portion 472 includes previous group thread information 476 (e.g., messages 221-224 in FIGS. 4A-4B, etc.), as well as additional messages of the fork communication thread, such as message 446 in FIG. 4B. In an example, when invoked, the fork mode response can optionally include information (e.g., messages, attachments, one or more screen shots of the view prior to invoking the fork communication thread, etc.) from the group communication stream, such as a last number of messages or attachments, information from a specific time period (e.g., the last 5 minutes of information, etc.), etc.

In an example, the body portion 472 can include a button 478. In certain examples, the first user can use the button 478 to select more or less of the group thread to include in the previous group thread information 476. In an example, selecting the button 478 can break out a crop tool showing more of the previous group thread and a movable selection box selectin the amount to share. In certain examples, the button 478 can illustrate to the second user that additional messages are available to scroll to or view by selection of the button 478.

The send button 217, the fork icon 367, and the toggle selection 368 can function as described and illustrated in FIG. 3D. The toggle selection 368 can enable transition back to the group communication stream, such as by invoking an expandable send menu 365 including a selectable group communication stream icon 366, invocation of which can toggle the operation mode, such as after a user has been added in the compose field 216, etc.

Although illustrated above as messages in a communication platform in FIGS. 3A-3D, and 4A-4B, the disclosure herein is applicable to drafting, creating, and responding to email messages in an email application.

Figure 5A:
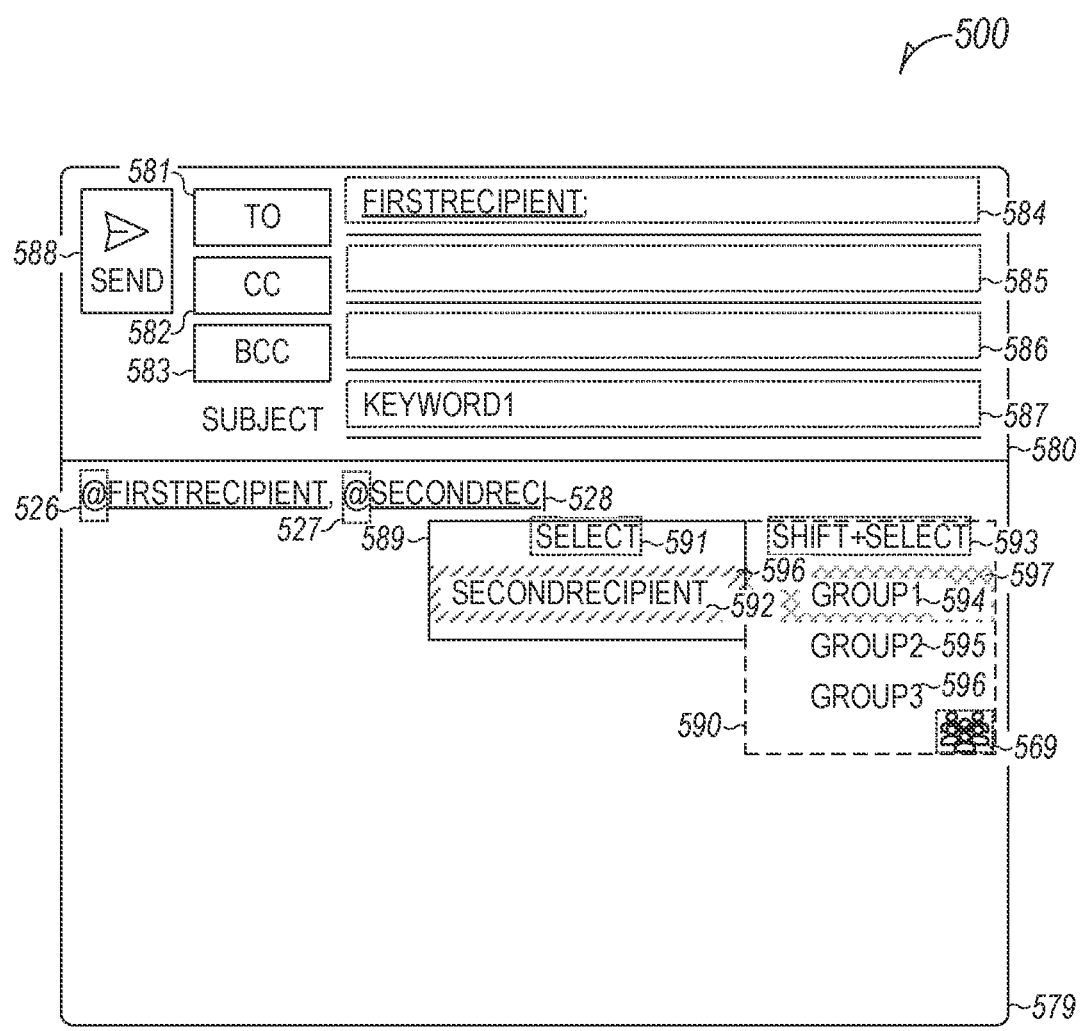
FIGS. 5A-5C illustrate an example common group feature in a communication service.
Figure 5B:
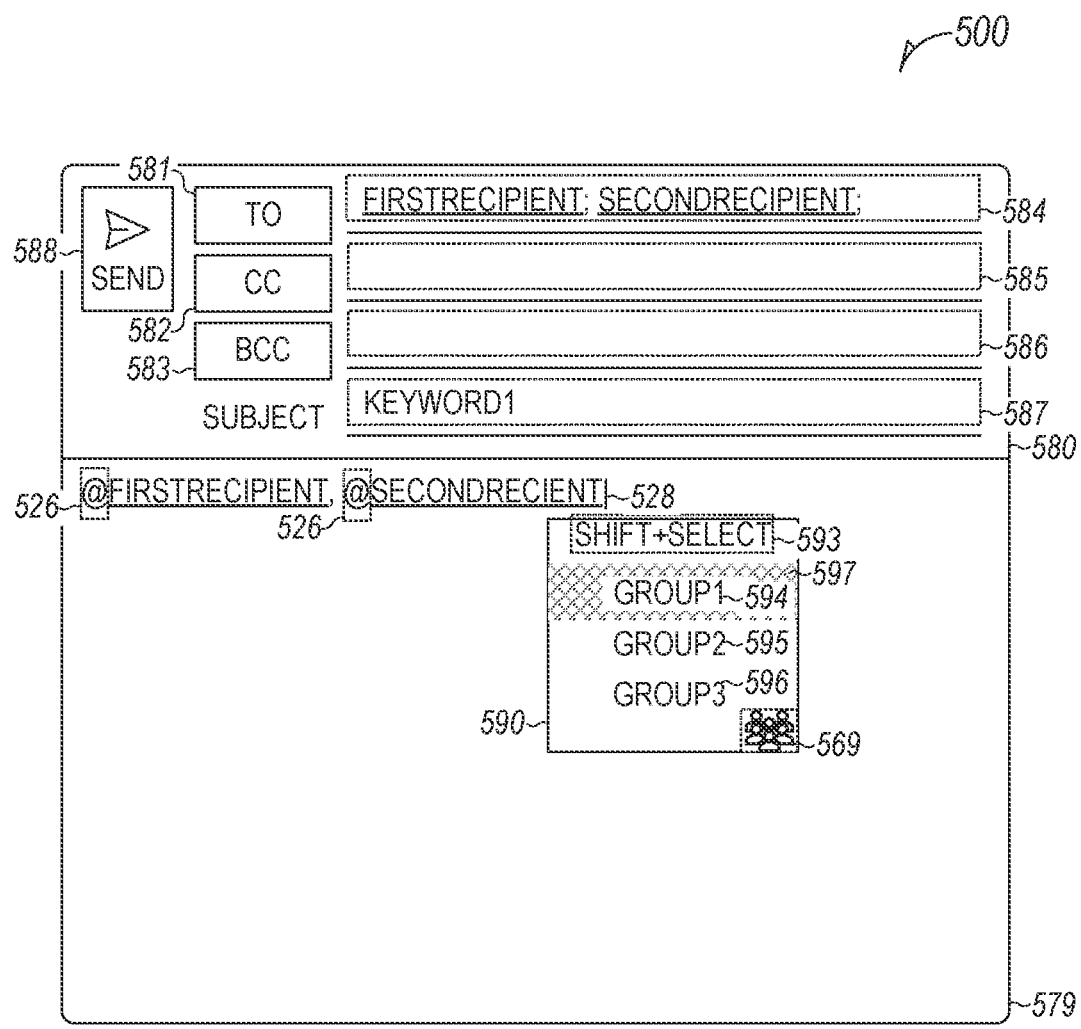
Figure 5C:
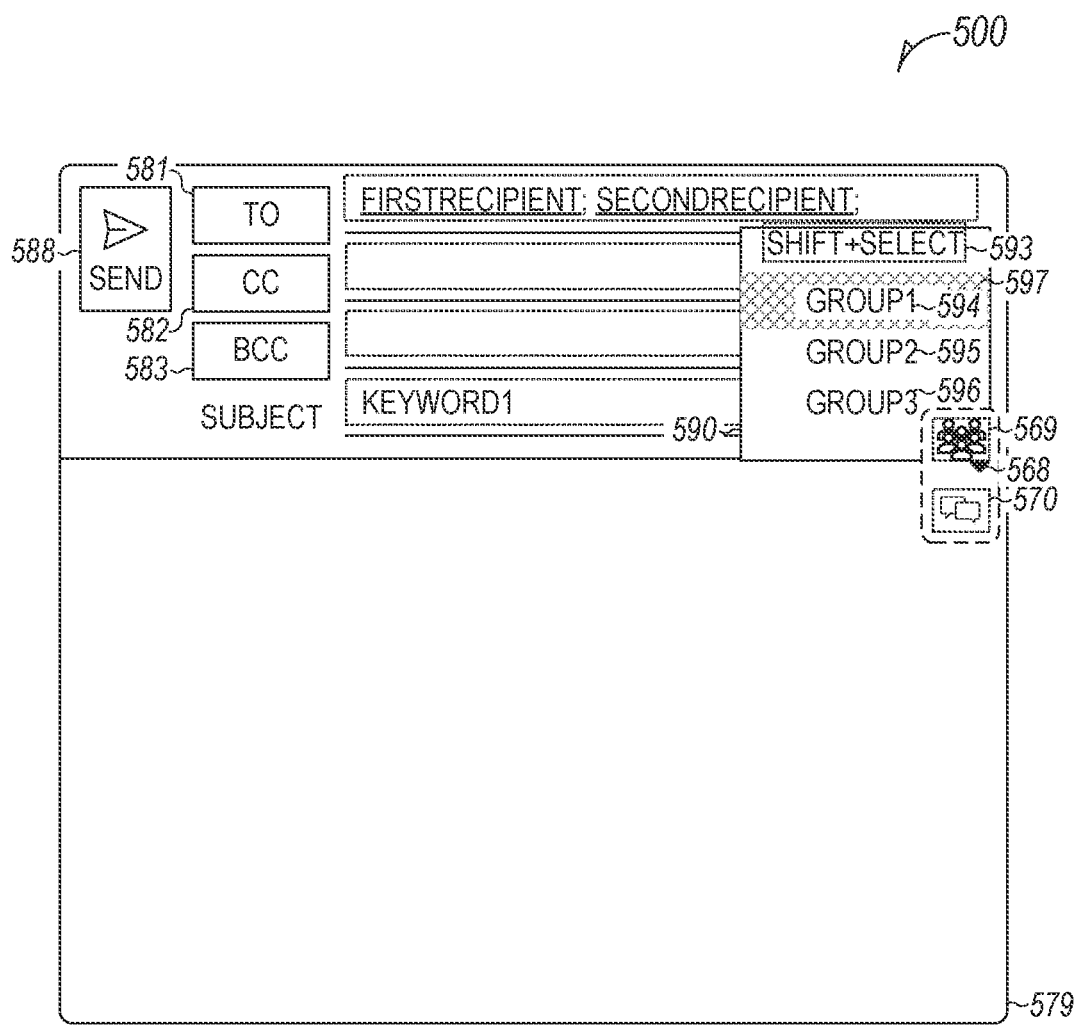

FIGS. 5A-5C illustrate an example user interface 500 of a communication platform of a first user including interaction with a new message on the communication platform and insertion of first and second recipients ("FIRSTRECIPIENT", "SECONDRECIPIENT", etc.) invoking a common group suggestion in a communication service. Although illustrated herein with respect to an email communication in an email platform, the disclosure herein is applicable to other messaging platforms, such as those illustrated in FIGS. 3A-3D and 4A-4B, etc.

The user interface 500 includes a header portion 580 and a body portion 579 configured to receive a body portion of the message. The header portion 580 includes different selectable fields and elements, including selectable "TO", "CC", and "BCC" buttons 581-583 and associated fields 584-586, a subject field 587, and a send button 588. Selection of the "TO", "CC", and "BCC" buttons 581-583 can launch a select name pop-up to search for one or more recipients for the associated fields 584-586 (e.g., the "TO" field 584, etc.). The select name pop-up typically includes one or more common groups available to be added to the new message as a recipient of one of the associated fields 584-586, typically including break-out descriptions of membership of each common group. However, in certain examples, it is not possible to search for a specific users group memberships. In other examples, membership of one or more (or all) groups can be private, such as determined by permissions, etc. However, use of such pop-up is burdensome, and stepping through each group of a communication service (e.g., of an organization, etc.) can require large amounts of time or even be impossible.

In FIG. 5A, the body portion 579 of the message includes a first "@mention" shortcode including a first "@" symbol 526 followed by text characters "FIRSTRECIPIENT". In response, the user "FIRSTRECIPIENT" has been addressed as a first recipient of the message in the "TO" field 584. The body portion 579 of the message additionally includes a second "@mention" shortcode including a second "@" symbol 527 followed by text characters "SECONDREC" and an active cursor 528. In response, an "@mention" menu 589 has been triggered, suggesting a target user "SECONDRECIPIENT" 592 as a highlighted selection 596.

Additionally, the user interface 500 includes an additional common group suggestion menu 590 automatically illustrating target groups "GROUP1", "GROUP2", and "GROUP3" 594-596 as three target common groups including both the first recipient and the target user, suggesting "GROUP1" 594 as a second highlighted selection 597.

In certain examples, the one or more target groups of the group suggestion menu can be ordered for display according to a set of rules (e.g., alphabetically, according to prior activity, inclusion in the communication stream, history with the user, etc.), and additionally with each additionally received character following the "@" symbol until the first user makes a selection, exhausts the list of common groups, such as stored and managed by the communication service at a remote server or database, etc., enters the complete common group name, or exits the function, such as by entering backspace, left arrow, delete, or escape symbols, selecting away from the generated list, etc.

In an example, the "@mention" menu 589 can optionally include, separate from or in addition to the common group suggestion menu 590, one or more control elements. In an example, the control element can include a description of a selection action to control selection of the operation mode (e.g., such as to select between an "@mention" response versus a common group suggestion response, etc.). For example, a first selection action ("SELECT") 591 can be displayed in the "@mention" menu 589 including a text description to invoke an action in such menu. The first user can select the highlighted selection 596 of the "@mention" menu 589 by traditional selection (e.g., a selection character, such as an enter or return character, a tab character, etc., or a user input selection, such as a mouse click, a long tap, a double-tap, etc.). A second selection action ("SHIFT+SELECT") 593 can be displayed in the common group suggestion menu 590 including a description to invoke a corresponding action in such menu. The first user can select the second highlighted selection 597 of the common group suggestion menu 590 by a combination of the shift key and traditional selection. Although illustrated herein as the instructions "SELECT" and "SHIFT+SELECT", other example text instructions can be used.

In certain examples, to further illustrate that the target groups "GROUP1", "GROUP2", and "GROUP3" 594-596 in the common group suggestion menu 590 are groups and not individual users, a group communication icon 569 can be displayed in the common group suggestion menu 590.

In FIG. 5B, the full name of the target user "SECONDRECIPIENT" has been input, selected, or received in the body portion 579 of the message, and the user "SECONDRECIPIENT" has been addressed as the second recipient of the message in the "TO" field 584. In response, the "@mention" menu 589 has closed. However, upon receiving the second or additional recipients, the common group suggestion menu 590 can remain or alternatively be automatically triggered, such as to suggest common groups to add as a recipient to the message (e.g., in the "TO" field 584, the "CC" field 585, or the "BCC" field 586, etc.) or, in certain examples, to replace the first and second recipients.

FIG. 5C illustrates an example alternate placement of the common group suggestion menu 590, depending, for example, whether the first and second recipients were entered in the "TO" field 584 or the body portion 579 of the message.

In an example, the user interface 500 can include a common group suggestion button, such as in a toolbar, a ribbon, or one or more other menus or areas of the user interface 500. Selection of the common group suggestion button can trigger identification of one or more common groups of received recipients, such as the first and second recipients entered in the "TO" field 584, etc. In certain examples, the common group suggestion button can be nested in the select name pop-up of the "TO", "CC", or "BCC" buttons 581-583.

In other examples, the common group suggestion menu 590 can trigger a transition from an email message to a message service, represented by a message service icon 570, in certain examples, selectable as an additional toggle selection 568 on the group communication icon 569.

In certain examples, the communication service can additionally identify one or more common groups based on semantic or natural language analysis of one or more keywords in the subject field 587 or the body portion 579 of the message, or alternatively, one or more messages in a message thread leading up to the new message, etc. For example, if the first user is emailing or messaging about a specific topic or area of technology, and adds one or more recipients to a first message, the communication service can supplement the one or more recipients with identified keywords to enhance, better sort, or make richer common group suggestions.

Figure 6:
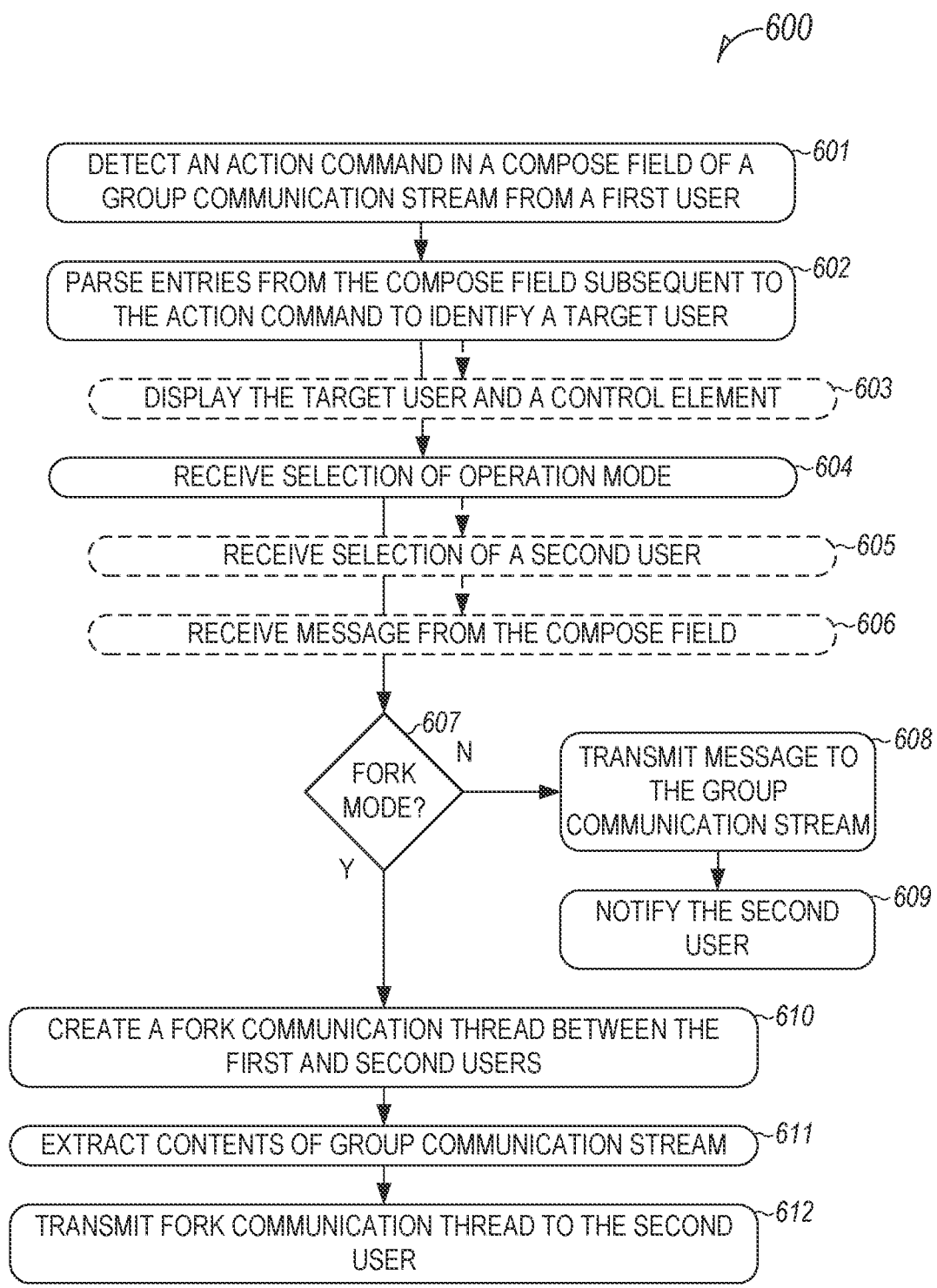
FIG. 6 illustrates an example method of controlling transition between notification and fork modes from a group communication stream.

FIG. 6 illustrates an example method 600 of controlling transition between notification and fork modes from a group communication stream by a communication platform executed on a first user device, or by a communication service connected to the communication platform.

At step 601, an action command, such as input by a first user in a compose field of a group communication stream can be detected, such as by the communication platform of the first user device. In an example, the action command can indicate a function to be performed by the communication platform or by the communication service connected to the communication platform, such as through a network, etc. In an example, the group communication stream can include a group thread, such as of a unified communication session between a plurality of participants including the first user, etc. In other examples, the group communication stream can include a string of emails or other messages between multiple participants. Although In certain examples, the communication service can receive information from the communication platform, perform one or more operations based on the received information, and provide instructions to the communication platform, such as to cause information to be displayed to or otherwise interact with the first user.

In an example, the action command can include a character, a symbol, or a specific combination of characters or symbols indicating a desired action, or one of a set of desired actions, such as of the first user. An example action command includes the "@" symbol followed by one or more characters, such as to trigger an "@mention" response. Once triggered, the system performing the method can enter a notification mode associated with the "@mention" response.

At step 602, entries from the compose field subsequent to the action command can be parsed, such as by the communication platform or the communication service, to identify one or more characters succeeding the action command in a compose field of the communication platform. A target user can be identified having one or more characters matching the one or more identified characters succeeding the action command in the compose field of the communication platform. A target user can be identified as one or more users available to the first user, or included in a user database managed or stored by the communication platform (e.g., of an organization, such as one or more company or private directories, etc.), the communication service, or one or more servers or databases associated with the communication service. In certain examples, if a large number of target users are identified as having characters matching the entries subsequent to the action command, a set of one or more rules can be applied to order the matching entries for initial display to the first user. For example, target users for display can be selected based according to prior activity, inclusion in the communication stream, history with the user, etc.

At step 603, a target user can be optionally displayed to the user, such as by a display of the first user device through the communication platform, etc.

In certain examples, a control element can be displayed with the target user, such that not only can the target user be selected as a second user by the first user, but that the operation mode can be transitioned from the notification mode to a fork mode, separate from the notification mode. In certain examples, the control element can include one or more of an icon, a separate menu element, or an instruction to perform a certain operation to select one of the notification mode or the fork mode. Alternatively, the first user can refrain from selecting either mode and exit the notification mode entirely, such as by selecting outside of any displayed menus, entering an exit character (e.g., backspace, delete, escape, etc.), etc.

At step 604, a selection of one of two operation modes in which the system operates can be received, such as by a user interface of the first device through the communication platform, etc. The two operation modes can include the fork mode and the notification mode.

At step 605, a selection of a second user can be received, such as in response to displaying the target user (or one or more target users, etc.). In certain examples, the selection of the second user can be received with the selection of the operation mode, such as by selection of or interaction with a control element, including, for example, the icons or menus illustrated and described above in FIGS. 3A-3D, etc.

At step 606, a message can be received from a compose field of the communication platform, such as through a user interface of the first device, etc.

At step 607, if the received operation mode is not the fork mode, the system can stay in the notification mode and the method can proceed to step 608. At step 608, the received message can be transmitted to the group communication stream. At step 609, the second user can be notified of the message in accordance with the "@mention" response.

Alternatively at step 607, if the received operation mode is the fork mode, the system can transition from the notification mode to the fork mode and the method can proceed to step 610. At step 610, a fork communication thread can be created between the first and second users, separate from a group view of the group communication stream and, in certain examples, not viewable by members of the group communication stream outside of the first and second users (unless separately added by the first user, etc.).

In certain examples, the fork communication thread can include a new message for an existing communication thread between the first and second users, if a private message thread, or a message thread away from the group communication stream, already exists. In other examples, a new thread can be created for this specific message, including its contents, separate from any existing thread, private or otherwise, between the first and second users, such as to better organize and maintain a record of the fork communication thread, separate from other communication between the first and second users. In other examples, the fork communication thread can include an email message between the first and second users.

At step 611, at least some contents from the group communication stream can be extracted, such as messages, attachments, etc. In certain examples, a present number of previous messages or attachments can be initially extracted. In other examples, the first user can select or alter the contents for extraction and packaging with the optional received message.

At 612, the fork communication thread, including the optional received message and the packaged extracted contents, can be transmitted to the second user, such as for display using a communication platform, etc., as a group thread, as an email communication, etc.

Figure 7:
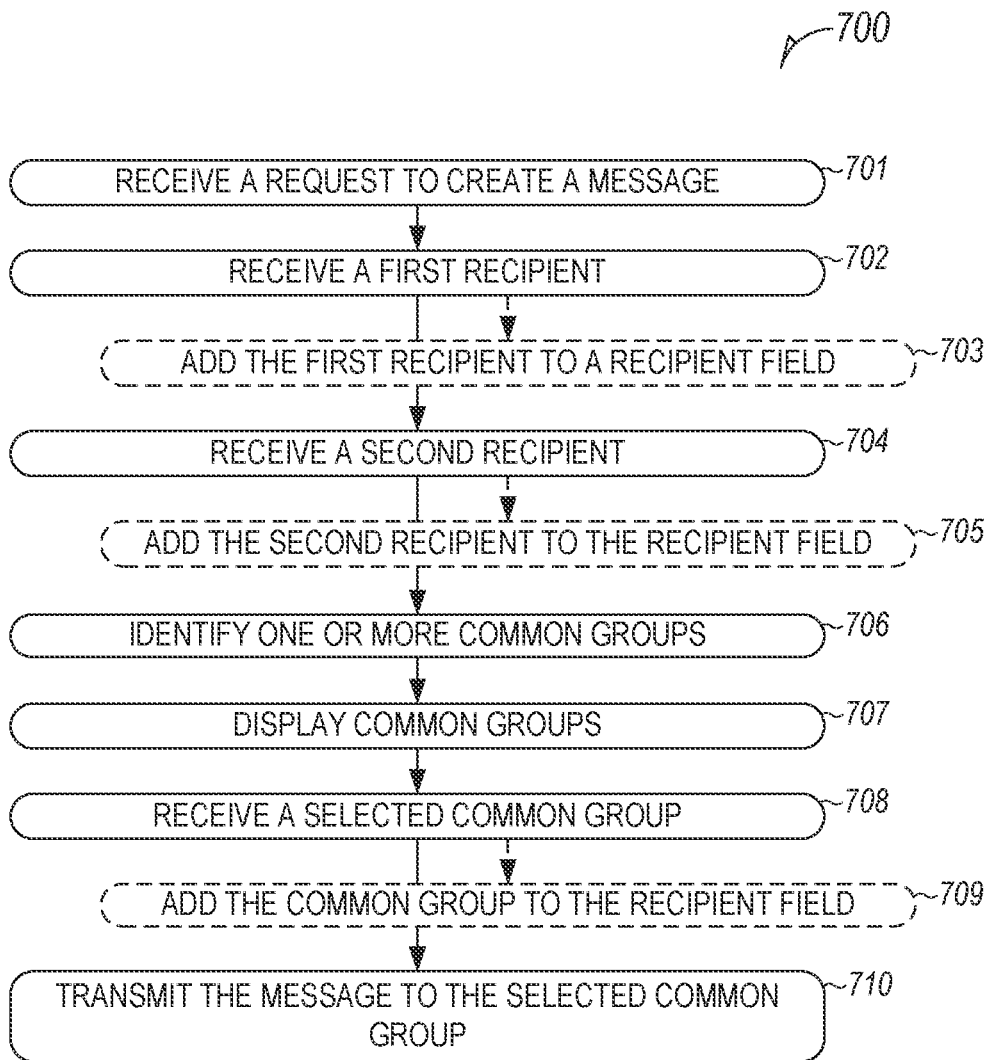
FIG. 7 illustrates an example method of providing common group suggestions to messages in a communication service.

FIG. 7 illustrates an example method 700 of providing common group suggestions as recipients to of messages, such as by a communication platform executed on a first user device or by a communication service connected to the communication platform.

At step 701, a request to create a message can be received from a first user, such as in the communication platform on a first user device. In an example, the request can include a request to create a new email message, a request to create a new message in a messaging application, etc.

At step 702, a first recipient can be received from the first user, such as through the communication platform. In an example, the first recipient can be received in a recipient field of the new message, such as a "TO" field of an email. In other examples, such as in a messaging application, the request to create a new message can be from a contact page of the first recipient. In other examples, the first recipient can be received in a body or a compose field of the new message. At step 703, the first recipient can optionally be added to the recipient field, such as in an email communication, or if entering in a compose field as part of an "@mention" response or accepting an autofill suggestion after receiving a partial username, etc.

At step 704, a second recipient can be received from the first user, and at step 705, optionally added to the recipient field. At step 706, one or more common groups can be identified based on the first and second recipients, such as common groups of the communication service (e.g., of an organization, etc.) or stored in a user database (e.g., of which the first user is a member or has access to, etc.). One or both of the communication platform or the communication service can identify the one or more common groups based on the received first and second recipients, or a combination of a first recipient and a target recipient, etc.

In certain examples, at step 704, a target second recipient can be identified based on received characters, such as in a recipient field or with respect to an action command (e.g., an "@mention" response, etc.), and presented to the first user for selection, such as described herein. However, before the second recipient is selected or received, one or more common groups can be identified including the received first user and the target second user and presented to the user along with the identified target second recipient, as illustrated and described in FIG. 5A, etc.

At step 707, a set of the identified one or more common groups can be displayed to the first user, such as through the communication platform on a display of a first user device, etc., as a suggested recipient of the message. The set of the identified one or more common groups can include all or less than all of the identified one or more common groups, depending, in certain examples, on the number of common groups identified and the number chosen to be presented to the first user. For example, if five common groups are identified throughout the communication service as including the received first and second recipients, and three are presented to the user, then a set of one or more rules can be applied to order the identified common groups for initial display to the first user. For example, identified common groups can be ordered for display according to overall activity, prior activity with the first user, etc.

At step 708, a selected one of the set of the identified one or more common groups can be received from the first user as a selected common group and, at step 709, the selected common group can optionally be added to the recipient field of the message. In certain examples, the selected common group can be added as a separate recipient to the message, such as in one or more fields (e.g., a "TO" field, a "CC" field, a "BCC" field, etc.), etc., in addition to separately addressing the first and second users. However, such activity provides a priority of inclusion by the first user, which in certain examples is not desirable. In other examples, the selected common group can replace the first and second users as recipients of the message, instead solely addressing the message to the selected common group including the first and second recipients, but not separately addressing the first and second recipients used to determine the common group.

At step 710, the message can be transmitted to the selected common group, including causing the message to be displayed to the selected common group as a group thread, as an email communication, etc.

Figure 8:
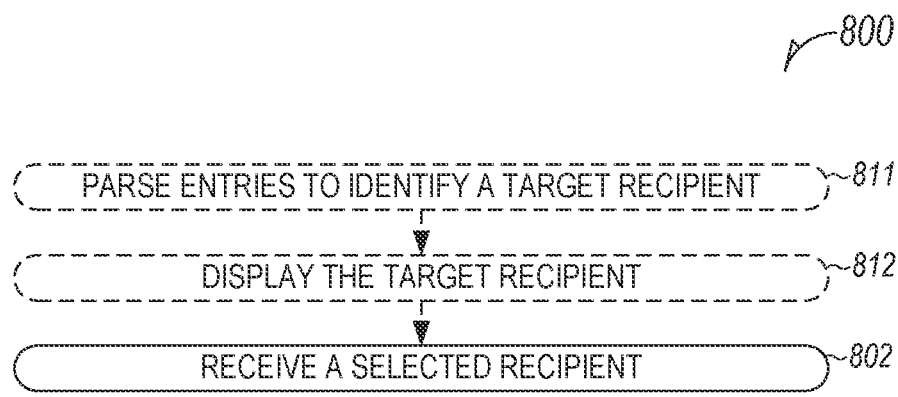
FIG. 8 illustrates an example method of selecting a recipient.

FIG. 8 illustrates an example method of receiving a selected recipient, such as a first recipient or a second recipient, based on characters entered in a recipient field or in a compose field, such as part of an "@mention" response, a user search box, etc.

At step 811, entries from a recipient field, or separately, in a compose field as part of an "@mention" response, can be received from a user interface of a first user device and parsed, such as by a communication interface or a communication service coupled to the communication interface, to identify one or more target recipients, for example, having a first one or more characters matching the entries from the recipient field.

At step 812, the one or more target recipients can be displayed to the first user, such as on a display of the first user device through a communication platform, etc. At step 802, a selected recipient can be received from the first user through the user interface of the first user device.

Figure 9:
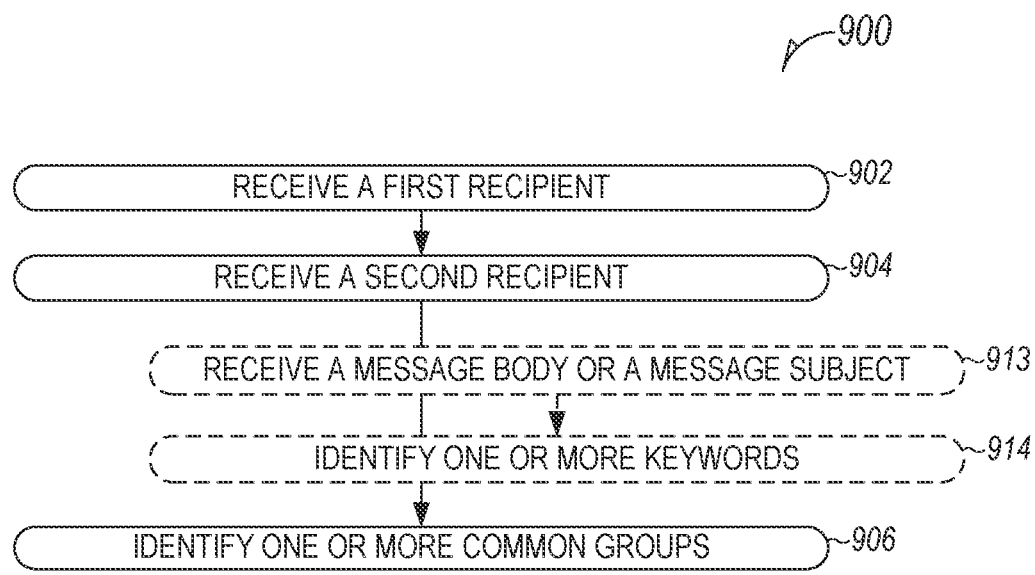
FIG. 9 illustrates an example method of identifying a common group.

FIG. 9 illustrates an example method of identifying a common group using the first and second recipients and optionally one or more keywords or other information from the first user.

At step 902, a first recipient can be received from the first user, such as through a communication platform coupled to a communication service. At step 904, a second recipient can be received from the first user, such as through the communication platform. In an example, the first and second recipients can be received from the first user, such as based on characters entered in a recipient field or in a compose field of a message or email communication, etc. In other examples, the first and second recipients can be received from the first user, such as by radio selection from a larger roster of individuals of a group thread, a group communication stream, or one or more other groups of users, etc.

At step 913, a message body or a message subject can be received, including one or more characters input by the first user. At step 914, one or more keywords can be identified from the message body or the message subject, such as based on semantic or natural language analysis of message body or the message subject, or alternatively, one or more messages in a message thread leading up to the message body or the message subject, etc.

At step 906, one or more common groups can be identified, such as by the communication platform or the communication service, based on the received first and second users as well as the identified one or more keywords from the message body or the message subject. In certain examples, in addition to identifying common groups with the first and second users, the communication service can receive and store text descriptions of common groups stored in a user database and further sort or supplement the identified common groups based on matching results from the identified keywords and the received and stored text descriptions of the common groups.

Figure 10:
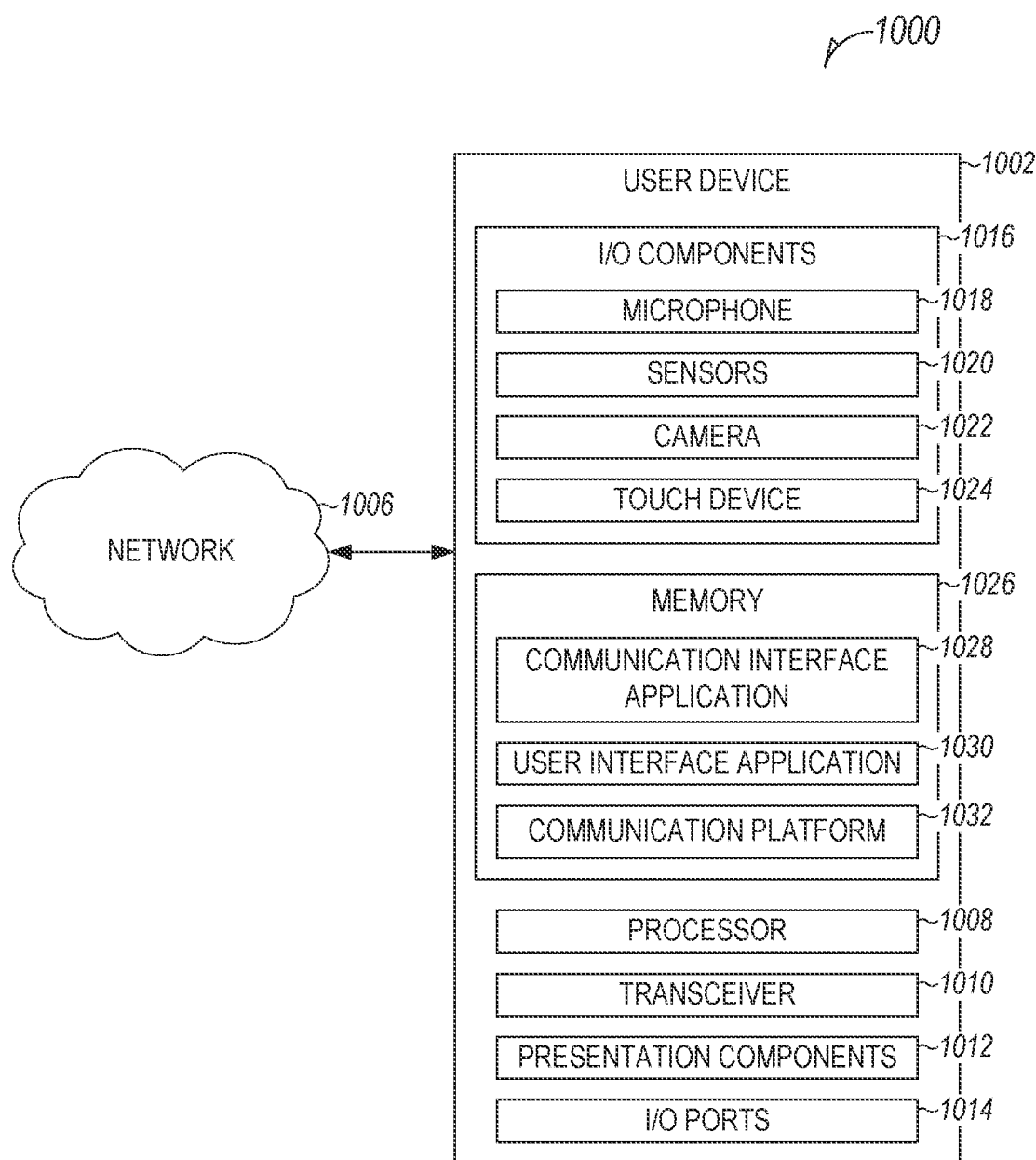
FIG. 10 illustrates an example system including a user device.

FIG. 10 illustrates an example system 1000 including a user device 1002 (e.g., a computing device) having at least one processor 1008, a transceiver 1010, one or more presentation components 1012, one or more input/output (I/O) ports 1014, and a memory 1026. The user device 1002 can take the form of a mobile computing device or any other portable device, such as a mobile telephone, laptop, tablet, computing pad, notebook, gaming device, portable media player, etc. In other examples, the user device 1002 can include a less portable device, such as desktop personal computer, kiosk, tabletop device, industrial control device, etc. Other examples can incorporate the user device 1002 as part of a multi-device system in which two separate physical devices share or otherwise provide access to the illustrated components of the user device 1002.

The processor 1008 can include any quantity of processing units and is programmed to execute computer-executable instructions for implementing aspects of the disclosure. The instructions may be performed by the processor or by multiple processors within the computing device or performed by a processor external to the user device 1002. In some examples, the processor 1008 is programmed to execute methods, such as the one or more methods illustrated herein, etc. Additionally, or alternatively, the processor 1008 can be programmed to present an experience in a user interface ("UI"). For example, the processor 1008 can represent an implementation of techniques to perform the operations described herein.

The transceiver 1010 can include an antenna capable of transmitting and receiving radio frequency ("RF") signals and various antenna and corresponding chipsets to provide communicative capabilities between the user device 1002 and one or more other remote devices. Examples are not limited to RF signaling, however, as various other communication modalities may alternatively be used.

The presentation components 1012 can include, without limitation, computer monitors, televisions, projectors, touch screens, phone displays, tablet displays, wearable device screens, televisions, speakers, vibrating devices, and any other devices configured to display, verbally communicate, or otherwise indicate image search results to a user of the user device 1002 or provide information visibly or audibly on the user device 1002. For example, the user device 1002 can include a smart phone or a mobile tablet including speakers capable of playing audible search results to the user. In other examples, the user device 1002 can include a computer in a car that audibly presents search responses through a car speaker system, visually presents search responses on display screens in the car (e.g., situated in the car's dashboard, within headrests, on a drop-down screen, etc.), or combinations thereof. Other examples present the disclosed search responses through various other display or audio presentation components 1012.

I/O ports 1014 allow the user device 1002 to be logically coupled to other devices and I/O components 1016, some of which may be built into user device 1002 while others may be external.

I/O components 1016 can include a microphone 1018, one or more sensors 1020, a camera 1022, and a touch device 1024. The microphone 1018 can capture speech from the user and/or speech of or by the user. The sensors 1020 can include any number of sensors on or in a mobile computing device, electronic toy, gaming console, wearable device, television, vehicle, or other user device 1002, such as one or more of an accelerometer, magnetometer, pressure sensor, photometer, thermometer, global positioning system ("GPS") chip or circuitry, bar scanner, biometric scanner for scanning fingerprint, palm print, blood, eye, or the like, gyroscope, near-field communication ("NFC") receiver, or any other sensor configured to capture data from the user or the environment. The camera 1022 can capture images or video of or by the user. The touch device 1024 can include a touchpad, track pad, touch screen, or other touch-capturing device. In other examples, the I/O components 1016 can include one or more of a sound card, a vibrating device, a scanner, a printer, a wireless communication device, or any other component for capturing information related to the user or the environment.

The memory 1026 can include any quantity of memory associated with or accessible by the user device 1002. The memory 1026 can be internal to the user device 1002, external to the user device 1002, or a combination thereof. The memory 1026 can include, without limitation, random access memory (RAM), read only memory (ROM), electronically erasable programmable read only memory (EEPROM), flash memory or other memory technologies, CDROM, digital versatile disks (DVDs) or other optical or holographic media, magnetic cassettes, magnetic tape, magnetic disk storage or other magnetic storage devices, memory wired into an analog computing device, or any other medium for encoding desired information and for access by the user device 1002. The terms computer-readable medium, machine readable medium, and storage device do not include carrier waves to the extent carrier waves are deemed too transitory. The memory 1026 can take the form of volatile and/or nonvolatile memory, can be removable, non-removable, or a combination thereof; and can include various hardware devices, e.g., solid-state memory, hard drives, optical-disc drives, etc. Additionally, or alternatively, the memory 1026 can be distributed across multiple user devices 1002, such as in a virtualized environment in which instruction processing is carried out on multiple ones of the user device 1002. The memory 1026 can store, among other data, various device applications that, when executed by the processor 1008, operate to perform functionality on the user device 1002. Example applications can include search applications, instant messaging applications, electronic-mail application programs, web browsers, calendar application programs, address book application programs, messaging programs, media applications, location-based services, search programs, and the like. The applications may communicate with counterpart applications or services such as web services accessible via the network 1006. For example, the applications can include client-operating applications that correspond to server-side applications executing on remote servers or computing devices in the cloud.

Instructions stored in the memory 1026 can include, among other things, one or more of a communication interface application 1028, a user interface application 1030, and a communication platform 1032 executed on the user device 1002. The communication interface application 1028 can include one or more of computer-executable instructions for operating a network interface card and a driver for operating the network interface card. Communication between the user device 1002 and other devices can occur using any protocol or mechanism over a wired or wireless connection or across the network 1006. In some examples, the communication interface application 1028 is operable with RF and short-range communication technologies using electronic tags, such as NFC tags, Bluetooth® brand tags, etc.

In some examples, the user interface application 1030 includes a graphics application for displaying data to the user and receiving data from the user. The user interface application 1030 can include computer-executable instructions for operating the graphics card to display search results and corresponding images or speech on or through the presentation components 1012. The user interface application 1030 can interact with the various sensors 1020 and camera 1022 to both capture and present information through the presentation components 1012.

Figure 11:
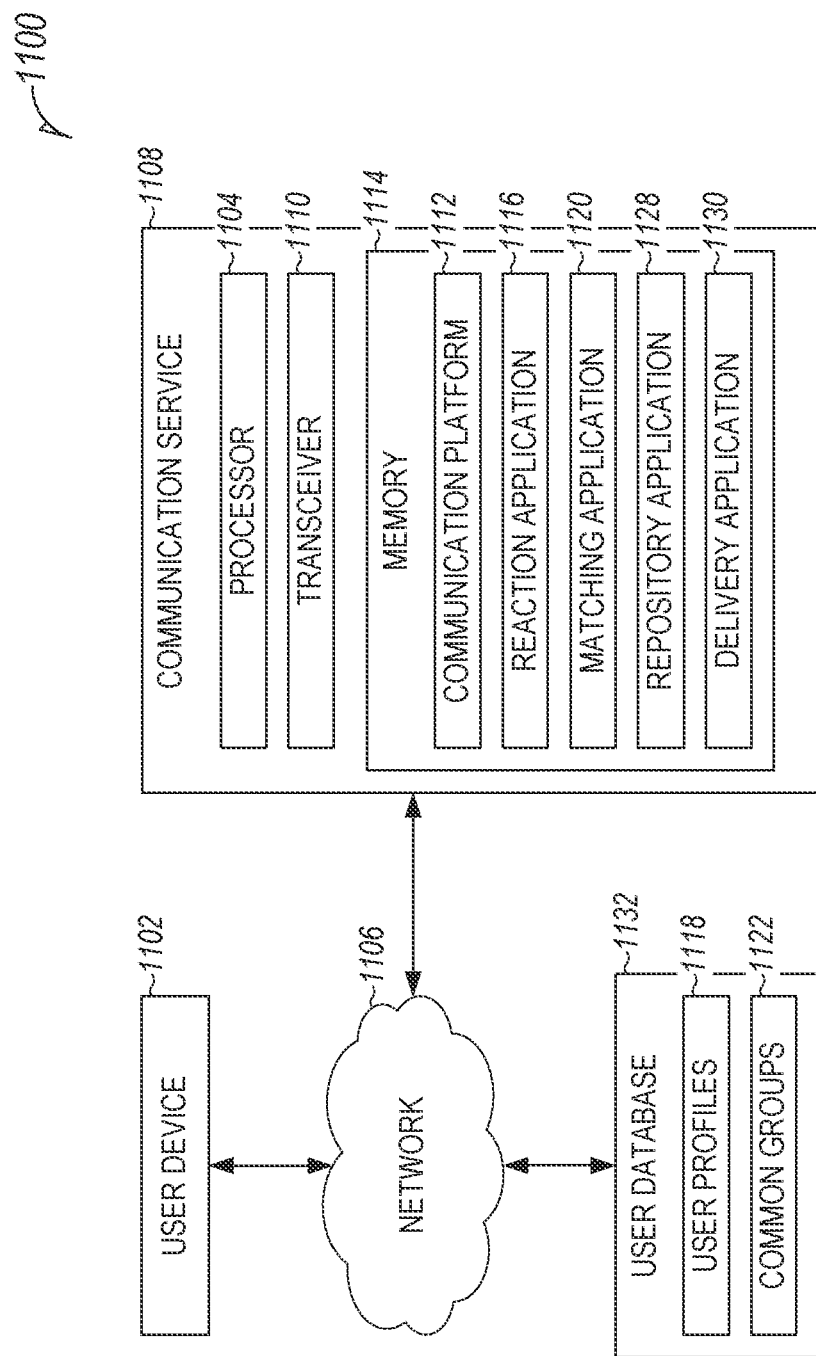
FIG. 11 illustrates an example networking environment including one or more user devices, a communication server, and a user database communicating over a network.

FIG. 11 illustrates an example networking environment 1100 including one or more user devices 1102, a communication service 1108, and a user database 1132 communicating over a network 1106. In some examples, user and environment data are communicated by the user devices 1102 over the network 1106 to the communication service 1108. In certain examples, the communication service 1108 can include one or more servers, memory, databases, or processors, and can be configured to provide and manage one or more messaging services or communication streams for one or more users or groups of users, such as users of the user devices 1102, etc.

The networking environment 1100 illustrated in FIG. 11 is an example of one suitable computing system environment and is not intended to suggest any limitation as to the scope of use or functionality of examples disclosed herein. The illustrated networking environment 1100 should not be interpreted as having any dependency or requirement related to any single component, module, index, or combination thereof, and in other examples, other network environments are contemplated.

The network 1106 can include the internet, a private network, a local area network (LAN), a wide area network (WAN), or any other computer network, including various network interfaces, adapters, modems, and other networking devices for communicatively connecting the user devices 1102 and the communication service 1108. The network 1106 can also include configurations for point-to-point connections.

The user device 1102 include any type of user device discussed herein. Each user device 1102 can capture user or environment data from their respective users and communicate the captured user and environment data over the network 1106 to the communication service 1108, such as using a communications interface application as discussed herein. In response, the communication service 1108 can be capable of providing and receiving messages including images, videos, audio, text, and other various communication media to and from user device 1102 over the network 1106.

The user device 1102 can include various software applications and presentation components for communicating via a communication platform 1112 for combining subsequent data in a communication stream. For example, a mobile phone can display a communication platform (e.g., Microsoft Teams application) for communicating with friends or other users in a group. The communication platform can include a feature that provides command-based generation, selection, and display of personalized composite icons or templates in a communication stream. Any number of different variations of user devices 1102 and presentation techniques can be used to procure and integrate devices.

The communication service 1108 represents a server or collection of servers configured to execute different web-service computer-executable instructions. The communication service 1108 includes a processor 1104 to process executable instructions, a transceiver 1110 to communicate over the network 1106, and a memory 1114 embodied with at least the following executable instructions: a communication platform 1112, a reaction application 1116, a matching application 1120, or one or more other applications, devices, or modules, such as a triggering device, an audio device, etc. The memory 1114 can include instructions for a repository application 1128 and a delivery application 1130. While the communication service 1108 is illustrated as a single box, it is not so limited, and can be scalable. For example, the communication service 1108 can include multiple servers operating various portions of software that collectively generate composite icons or templates for users of the one or more user devices 1102.

The user database 1132 can provide backend storage of Web, user, and environment data that can be accessed over the network 1106 by the communication service 1108 or the user device 1102 and used by the communication service 1108 to combine subsequent data in a communication stream. The Web, user, and environment data stored in the database includes, for example but without limitation, one or more user profiles 1118 and common groups 1122. The common groups 1122 can include one or more groups of users of the communication service 1108 and text descriptions of such groups. Additionally, though not shown for the sake of clarity, the servers of the user database 1132 can include their own processors, transceivers, and memory. Also, networking environment 1100 depicts the user database 1132 as a collection of separate devices from the communication service 1108 however, examples can actually store the discussed Web, user, and environment data shown in the user database 1132 on the communication service 1108.

Herein, a "user profile" refers to an electronically stored collection of information related to the user. Such information can be stored based on a user's explicit agreement or "opt-in" to having such personal information be stored, the information including the user's name, age, gender, height, weight, demographics, current location, residency, citizenship, family, friends, schooling, occupation, hobbies, skills, interests, Web searches, health information, birthday, anniversary, celebrated holidays, moods, user's condition, and any other personalized information associated with the user. The user profile includes static profile elements, e.g., name, birthplace, etc., and dynamic profile elements that change over time, e.g., residency, age, condition, etc. The user profile can be built through probing questions to the user or through analyzing the user's behavior on one or more user devices.

Additionally, user profiles 1118 can include static and/or dynamic data parameters for individual users. Examples of user profile data include, without limitation, a user's age, gender, race, name, location, interests, Web search history, social media connections and interactions, purchase history, routine behavior, jobs, or virtually any unique data points specific to the user. The user profiles 1118 can be expanded to encompass various other aspects of the user.

The present disclosure relates to systems and methods for providing a command-based personalized composite template in a communication stream according to at least the examples provided in the sections below:

(A1) In one aspect, some embodiments or examples include providing a command-based communication, including detecting an action command included in a compose field of a group thread of by a first user, wherein the action command indicates a function to be performed by a system, responsive to detecting the action command in the compose field, parsing entries from the compose field subsequent to the action command, identifying, based on the parsed entries from the compose field, a target user associated with the action command from a user database, receiving, from the first user, a user selection of one of two operation modes in which the system operates and a selection of the target user as a second user, wherein the two operation modes include a fork mode and a notification mode, responsive to the user selection selecting the fork mode, entering the fork mode by creating a fork communication thread between the first and second users, the fork communication thread diverging from the group thread, including receiving a message entered via the compose field, extracting contents of the group thread, packaging the extracted contents and the message received via the compose field into the fork communication thread having members including the first user and the second user, and transmitting the fork communication thread to the second user, and responsive to the user selection selecting the notification mode, entering the notification mode by creating a message in the group thread from the first user, including receiving a message entered via the compose field, transmitting the message to the group thread, and causing a notification to the second user of selection as the second user for the transmitted message.

(A2) In some embodiments of A1, parsing entries from the compose field subsequent to the action command includes identifying one or more characters succeeding the action command in the compose field, identifying the target user from the user database includes identifying one or more users having a first one or more characters matching the identified one or more characters succeeding the action command, causing, based upon one or more rules in a user selection mode, a set of the identified one or more users to be displayed to the first user, and receiving, from the first user, a selected one of the set of the identified one or more users as the second user.

(A3) In some embodiments of A1-A2, creating the fork communication thread includes creating a new message in an existing fork communication thread between the first and second users, and transmitting the fork communication thread to the second user includes causing the fork communication thread to be displayed to the first and second users.

(A4) In some embodiments of A1-A3, the group thread is of a group communication stream, and the fork communication thread between the first and second users is separate from a group view of the group communication stream and is not viewable by members of the group communication stream outside of the first and second users.

(A5) In some embodiments of A1-A4, some embodiments or examples include causing the target user and a control element to be displayed to the first user, the control element corresponding to the target user and indicating a desired one of the two operations modes, receiving, from the first user, the user selection of the one of two operation modes in which the system operates includes receiving selection of the control element corresponding to the target user, wherein receiving selection of the control element includes receiving the user selection selecting the fork mode and the target user as the second user.

(A6) In some embodiments of A1-A5, the control element includes a notification including a description of a selection action to select the control element, and receiving the user selection of the fork mode includes receiving the selection action by the first user in response to the notification including the description of the selection action.

(A7) In some embodiments of A1-A6, the group thread is a message thread of a unified communication session between a plurality of participants including the first user, and the fork communication thread is between the first and second users.

(A8) In some embodiments of A1-A7, the fork communication thread includes an email thread between the first and second users.

(B1) In one aspect, some embodiments or examples include providing a command-based communication, includes identifying, responsive to entries subsequent to an action command in a compose field of a group thread by a first user and based on the entries subsequent to the action command, a target user from a user database, causing the target user and a control element to be displayed to the first user, the control element corresponding to the target user and indicating a desire to transition an operation mode from a notification mode associated with the action command to a fork mode, receiving, from the first user, a user selection of one of two operation modes in which the system operates and a selection of the target user as a second user, wherein the two operation modes include a fork mode and a notification mode, and responsive to the user selection selecting the fork mode, entering the fork mode by creating a fork communication thread between the first and second users, the fork communication thread diverging from the group thread, including receiving a message entered via the compose field, extracting contents of the group thread, packaging the extracted contents and the message received via the compose field into the fork communication thread having members including the first user and the second user, and transmitting the fork communication thread to the second user.

(B2) In some embodiments of B1, some embodiments or examples include responsive to the user selection selecting the notification mode, entering the notification mode by creating a message in the group thread from the first user, including receiving a message entered via the compose field, transmitting the message to the group thread, and causing a notification to the second user of selection as the second user for the transmitted message.

(B3) In some embodiments of B1-B2, some embodiments or examples include detecting the action command in a compose field of a communication platform of the first user, wherein the action command indicates a function to be performed by the system, responsive to detecting the action command in the compose field, parsing entries from the compose field subsequent to the action command to identify one or more characters succeeding the action command, identifying the target user from the user database includes identifying one or more target users having a first one or more characters matching the identified one or more characters succeeding the action command, providing, based upon one or more rules in a user selection mode, a set of the identified one or more target users to the first user, and receiving, from the first user, a selected one of the set of the identified one or more target users as the second user.

(C1) In one aspect, some embodiments or examples include providing a common group suggestion as a recipient of a message in a communication service, including receiving, from a first user, a request to create a message, receiving, from the first user, a first recipient of the message, receiving, from the first user, a second recipient of the message, and responsive to receiving the first and second recipients of the message, automatically identifying one or more common groups of the communication service that include the first and second recipients as members and causing, based on one or more rules, at least one of the identified one or more common groups to be displayed to the first user as a suggested recipient of the message, receiving, from the first user, a selected one of the at least one of the identified one or more common groups as a selected common group, and transmitting the message to the selected common group.

(C2) In some embodiments of C1, the one or more common groups of the communication service includes one or more groups in a directory database or one or more distribution lists of an organization stored by the communication service and including the first and second recipients.

(C3) In some embodiments of C1-C2, the one or more common groups includes one or more common groups of recipients of respective prior messages of the first user stored by the communication service.

(C4) In some embodiments of C1-C3, transmitting the message to the selected common group includes causing the message to be displayed in a group communication stream.

(C5) In some embodiments of C1-C4, some embodiments or examples include receiving a message body entered via a compose field of the message or a message subject entered via a subject field of the message and identifying one or more keywords in the message body or the message subject, and identifying the one or more common groups of the communication service includes using the first and second recipients and identified one or more keywords.

(C6) In some embodiments of C1-C5, some embodiments or examples include, responsive to receiving the first recipient, adding the first recipient to a recipient field of the message.

(C7) In some embodiments of C1-C6, some embodiments or examples include, responsive to receiving the selected common group, replacing the first recipient with the selected common group in the recipient field of the message.

(C8) In some embodiments of C1-C7, some embodiments or examples include, responsive to receiving the second recipient, adding the second recipient to the recipient field of the message and responsive to receiving the selected common group, adding the selected common group to the recipient field of the message.

(C9) In some embodiments of C1-C8, causing the set of the identified one or more common groups to be displayed to the first user includes causing the set of the identified one or more common groups to be displayed to the first user in a group suggestion menu proximate an active cursor or a location of the received second recipient of the message before adding the second recipient to the recipient field of the message.

(C10) In some embodiments of C1-C9, some embodiments or examples include, responsive to receiving the selected common group, adding the selected common group to the recipient field of the message.

(C11) In some embodiments of C1-C10, receiving the first recipient of the message includes parsing a first set of entries from a recipient field or from a compose field subsequent to an action command to identify one or more characters of a first recipient, identifying a first target user from a user database matching the identified one or more characters from the first set of entries, causing the first target user to be displayed to the first user, receiving, from the first user, a selection of the first target user as the first recipient, and responsive to receiving the first recipient, adding the first recipient to a recipient field of the message, and receiving the second recipient of the message includes parsing a second set of entries from the recipient field or from the compose field subsequent to an action command to identify one or more characters of a second recipient, identifying a second target user from the user database matching the identified one or more characters from the second set of entries, causing the second target user to be displayed to the first user, receiving, from the first user, a selection of the second target user as the second recipient.

In yet another aspect, some embodiments include a system including a processor and a memory device coupled to the processor and having a program stored thereon for execution by the processor to perform operations comprising any of the embodiments of A1-A8, B1-B3, or C1-C11 described above in various combinations or permutations. In yet another aspect, some embodiments include a non-transitory computer-readable storage medium storing one or more programs for execution by one or more processors of a storage device, the one or more programs including instructions for performing any of the embodiments of A1-A8, B1-B3, or C1-C11 described above in various combinations or permutations. In yet another aspect, some embodiments include a method or a system including means for performing any of the embodiments of A1-A8, B1-B3, or C1-C11 described above in various combinations or permutations.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

In the description herein, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The included description of example embodiments is, therefore, not to be taken in a limited sense, and the scope of the present invention is defined by the appended claims.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

What is claimed is:

1. A system for providing a command-based communication, comprising:
   one or more processors; and
   a memory storing computer-executable instructions that, when executed, cause the one or more processors to control the system to perform operations comprising:
      detecting an action command included in a compose field of a group thread of a first user, wherein the action command indicates a function to be performed by the system;
      responsive to detecting the action command in the compose field, parsing entries from the compose field subsequent to the action command;
      identifying, based on the parsed entries from the compose field, a target user associated with the action command from a user database;
      causing the target user and two operational modes in which the system operates to be displayed to the first user;
      receiving, from the first user, a user selection of one of the two operational modes and a selection of the target user as a second user, wherein the two operation modes include a fork mode and a notification mode;
      responsive to the user selection selecting the fork mode, entering the fork mode by creating a fork communication thread between the first and second users, wherein the fork communication thread diverging is a private thread separate from the group thread, including:
         receiving a message entered via the compose field;
         extracting contents of the group thread;
         packaging the extracted contents and the message received via the compose field into the fork communication thread having members including the first user and the second user; and
         transmitting the fork communication thread to the second user; and
      responsive to the user selection selecting the notification mode, entering the notification mode by creating a message in the group thread from the first user, including:
         receiving a message entered via the compose field;
         transmitting the message to the group thread; and
         causing a notification to the second user of selection as the second user for the transmitted message.

2. The system of claim 1,
   wherein parsing entries from the compose field subsequent to the action command includes identifying one or more characters succeeding the action command in the compose field,
   wherein identifying the target user from the user database includes identifying one or more users having a first one or more characters matching the identified one or more characters succeeding the action command, and
   wherein the operations include:

causing, based upon one or more rules in a user selection mode, a set of the identified one or more users to be displayed to the first user; and receiving, from the first user, a selected one of the set of the identified one or more users as the second user.

3. The system of claim 1, wherein creating the fork communication thread comprises creating a new message in an existing fork communication thread between the first and second users, and wherein transmitting the fork communication thread to the second user comprises causing the fork communication thread to be displayed to the first and second users.

4. The system of claim 1, wherein the group thread is of a group communication stream, and wherein the fork communication thread between the first and second users is separate from a group view of the group communication stream and is not viewable by members of the group communication stream outside of the first and second users.

5. The system of claim 1, wherein the operations include:

causing the target user and a control element to be displayed to the first user, the control element corresponding to the target user and indicating a desired one of the two operational modes, wherein receiving, from the first user, the user selection of the one of two operational modes in which the system operates includes receiving selection of the control element corresponding to the target user, wherein receiving selection of the control element includes receiving the user selection selecting the fork mode and the target user as the second user.

6. The system of claim 5, wherein the control element includes a notification including a description of a selection action to select the control element, and wherein receiving the user selection of the fork mode includes receiving the selection action by the first user in response to the notification including the description of the selection action.

7. The system of claim 1, wherein the group thread is a message thread of a unified communication session between a plurality of participants including the first user, and wherein the fork communication thread is between the first and second users.

8. The system of claim 7, wherein the fork communication thread includes an email thread between the first and second users.

9. A system for providing a command-based communication, comprising:

one or more processors; and a memory storing computer-executable instructions that, when executed, cause the one or more processors to control the system to perform operations comprising:

identifying, responsive to entries subsequent to an action command in a compose field of a group thread of a first user and based on the entries subsequent to the action command, a target user from a user database;

causing the target user and a control element to be displayed to the first user, the control element corresponding to the target user and indicating a desire to transition an operation mode from a notification mode associated with the action command to a fork mode;

receiving, from the first user, a user selection of one of two operation modes in which the system operates and a selection of the target user as a second user, wherein the two operation modes include a fork mode and a notification mode; and responsive to the user selection selecting the fork mode, entering the fork mode by creating a fork communication thread between the first and second users, wherein the fork communication thread is a private thread separate from the group thread, including:

receiving a message entered via the compose field;

extracting contents of the group thread;

packaging the extracted contents and the message received via the compose field into the fork communication thread having members including the first user and the second user; and transmitting the fork communication thread to the second user.

10. The system of claim 9, wherein the operations include:

responsive to the user selection selecting the notification mode, entering the notification mode by creating a message in the group thread from the first user, including:

receiving a message entered via the compose field;

transmitting the message to the group thread; and causing a notification to the second user of selection as the second user for the transmitted message.

11. The system of claim 9, wherein the operations include:

detecting the action command in a compose field of a communication platform of the first user, wherein the action command indicates a function to be performed by the system;

responsive to detecting the action command in the compose field, parsing entries from the compose field subsequent to the action command to identify one or more characters succeeding the action command;

wherein identifying the target user from the user database includes identifying one or more target users having a first one or more characters matching the identified one or more characters succeeding the action command;

providing, based upon one or more rules in a user selection mode, a set of the identified one or more target users to the first user; and receiving, from the first user, a selected one of the set of the identified one or more target users as the second user.

12. The system of claim 9, wherein the control element includes a notification including a description of a selection action to select the control element, and wherein receiving the user selection of the fork mode includes receiving the selection action by the first user in response to the notification including the description of the selection action.

13. A method for providing a command-based communication, comprising:

detecting an action command included in a compose field of a group thread of a first user, wherein the action command indicates a function to be performed by a system;

responsive to detecting the action command in the compose field, parsing entries from the compose field subsequent to the action command;

identifying, based on the parsed entries from the compose field, a target user associated with the action command from a user database;

causing the target user and two operation modes in which the system operates to be displayed to the first user;

receiving, from the first user, a user selection of one of the two operation modes and a selection of the target user as a second user, wherein the two operation modes include a fork mode and a notification mode;

wherein the fork mode comprises, responsive to the user selection selecting the fork mode, entering the fork mode by creating a fork communication thread between the first and second users, the fork communication thread diverging from the group thread, including:
receiving a message entered via the compose field;
extracting contents of the group thread;
packaging the extracted contents and the message received via the compose field into the fork communication thread having members including the first user and the second user; and
transmitting the fork communication thread to the second user; and wherein the notification mode comprises, responsive to the user selection selecting the notification mode, entering the notification mode by creating a message in the group thread from the first user, including:
receiving a message entered via the compose field;
transmitting the message to the group thread; and
causing a notification to the second user of selection as the second user for the transmitted message.

14. The method of claim 13,
wherein parsing entries from the compose field subsequent to the action command includes identifying one or more characters succeeding the action command in the compose field,
wherein identifying the target user from the user database includes identifying one or more users having a first one or more characters matching the identified one or more characters succeeding the action command, and
wherein the method includes:
causing, based upon one or more rules in a user selection mode, a set of the identified one or more users to be displayed to the first user; and
receiving, from the first user, a selected one of the set of the identified one or more users as the second user.

15. The method of claim 13,
wherein creating the fork communication thread comprises creating a new message in an existing fork communication thread between the first and second users, and
wherein transmitting the fork communication thread to the second user comprises causing the fork communication thread to be displayed to the first and second users.

16. The method of claim 13,
wherein the group thread is of a group communication stream, and
wherein the fork communication thread between the first and second users is separate from a group view of the group communication stream and is not viewable by members of the group communication stream outside of the first and second users.

17. The method of claim 13, comprising:
causing the target user and a control element to be displayed to the first user, the control element corresponding to the target user and indicating a desired one of the two operations modes,
wherein receiving, from the first user, the user selection of the one of two operation modes in which the system operates includes receiving selection of the control element corresponding to the target user, wherein receiving selection of the control element includes receiving the user selection selecting the fork mode and the target user as the second user.

18. The method of claim 17,
wherein the control element includes a notification including a description of a selection action to select the control element, and
wherein receiving the user selection of the fork mode includes receiving the selection action by the first user in response to the notification including the description of the selection action.

19. The system of claim 1, wherein causing the two operational modes to be displayed to the first user comprises causing a group icon and a fork icon to be displayed to the first user.

* * * * *